United States Patent
You et al.

(10) Patent No.: US 11,825,564 B2
(45) Date of Patent: Nov. 21, 2023

(54) METHOD AND APPARATUS FOR DETERMINING AVAILABILITY OF RESOURCE IN WIRELESS COMMUNICATION SYSTEM

(71) Applicant: LG Electronics Inc., Seoul (KR)

(72) Inventors: Hyangsun You, Seoul (KR); Sukhyon Yoon, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 17/139,711

(22) Filed: Dec. 31, 2020

(65) Prior Publication Data

US 2021/0127453 A1    Apr. 29, 2021

Related U.S. Application Data

(63) Continuation of application No. 16/813,435, filed on Mar. 9, 2020, now Pat. No. 10,887,945, which is a
(Continued)

(30) Foreign Application Priority Data

Jan. 25, 2019  (KR) ......................... 10-2019-0010091
Mar. 29, 2019  (KR) ......................... 10-2019-0037364

(51) Int. Cl.
*H04W 88/14*        (2009.01)
*H04W 56/00*        (2009.01)
(Continued)

(52) U.S. Cl.
CPC ........... *H04W 88/14* (2013.01); *H04W 16/28* (2013.01); *H04W 56/001* (2013.01);
(Continued)

(58) Field of Classification Search
CPC ... H04W 88/14; H04W 16/28; H04W 56/001; H04W 72/042; H04W 72/0493;
(Continued)

(56) References Cited

U.S. PATENT DOCUMENTS 10,887,945  B2 *  1/2021  You ....................... H04W 88/14
2017/0331670  A1    11/2017  Parkvall et al.
(Continued)

FOREIGN PATENT DOCUMENTS

KR          20220150840          11/2022

OTHER PUBLICATIONS

Ericsson, "Updated summary of 7.2.3.1 Enhancements to support NR backhaul Links," R1-1812042, 3GPP TSG RAN WG1 Meeting #94bis, Chengdu, China, Oct. 8-12, 2018, 22 pages.
(Continued)

*Primary Examiner* — Walli Z Butt
(74) *Attorney, Agent, or Firm* — Fish & Richardson P.C.

(57) ABSTRACT

The disclosure proposes a resource determination method performed by a communication node in a wireless communication system and a communication node using the method. The method may be a method performed for an IAB system.

8 Claims, 31 Drawing Sheets

Related U.S. Application Data continuation of application No. PCT/KR2020/000561, filed on Jan. 13, 2020.

(60) Provisional application No. 62/806,050, filed on Feb. 15, 2019, provisional application No. 62/791,107, filed on Jan. 11, 2019.

(51) Int. Cl.
   *H04W 76/27* (2018.01)
   *H04W 16/28* (2009.01)
   *H04W 72/23* (2023.01)
   *H04W 72/53* (2023.01)

(52) U.S. Cl.
   CPC ........... *H04W 72/23* (2023.01); *H04W 72/53* (2023.01); *H04W 76/27* (2018.02)

(58) Field of Classification Search
   CPC ..... H04W 76/27; H04W 72/23; H04W 72/53; H04L 5/0053
   See application file for complete search history.

(56) References Cited

U.S. PATENT DOCUMENTS

| | | | | |
|---|---|---|---|---|
| 2019/0246410 | A1* | 8/2019 | Zhang | H04W 72/0446 |
| 2019/0350023 | A1* | 11/2019 | Novlan | H04L 5/16 |
| 2019/0393980 | A1* | 12/2019 | Lin | A01K 63/047 |
| 2019/0394749 | A1* | 12/2019 | Islam | H04W 24/08 |
| 2020/0146099 | A1* | 5/2020 | Abedini | H04L 1/0003 |
| 2020/0229242 | A1* | 7/2020 | Xiong | H04W 74/0833 |
| 2021/0152306 | A1* | 5/2021 | Liu | H04L 5/0035 |
| 2021/0368425 | A1* | 11/2021 | Bao | H04W 48/16 |
| 2022/0007401 | A1* | 1/2022 | Harada | H04W 72/20 |

OTHER PUBLICATIONS

LG Electronics, "Discussions on mechanisms to support NR IAB scenarios," R1-1812564, 3GPP TSG RAN WG1 Meeting #95, Spokane, USA, Nov. 12-16, 2018, 5 pages.

LG Electronics, "Discussions on mechanisms to support NR IAB scenarios," R1-1810273, 3GPP TSG RAN WG1 Meeting #94bis, Chengdu, China, Oct. 8-12, 2018, 7 pages.

Nokia, Nokia Shanghai Bell, "Resource allocation/coordination between Parent BH and Child Links," R1-1810675, 3GPP TSG RAN WG1 Meeting #94bis, Chengdu, China, Oct. 8-12, 2018, 10 pages.

Intel Corporation, "Mechanisms for Resource Multiplexing among Backhaul and Access links," R1-1912202, 3GPP TSG RAN WG1 #99, Nov. 18-22, 2019 Chongqing, China, 5 pages.

KR Notice of Acceptance in Korean Application No. 10-2021-7021344, dated Dec. 27, 2022, 8 pages (English Translation).

Qualcomm Inc. "Motivation for WI on Integrated Access and Backhaul for NR," RP-182323, 3GPP TSG RAN Meeting #82, Sorrento, Italy, Dec. 10-13, 2018, 6 pages.

* cited by examiner

METHOD AND APPARATUS FOR DETERMINING AVAILABILITY OF RESOURCE IN WIRELESS COMMUNICATION SYSTEM

CROSS-REFERENCE TO RELATED APPLICATIONS

This application is a continuation of U.S. application Ser. No. 16/813,435, filed on Mar. 9, 2020, which is a continuation pursuant to 35 U.S.C. § 119(e) of International Application PCT/KR2020/000561, with an international filing date of Jan. 13, 2020, which claims the benefit of U.S. Provisional Patent Application Nos. 62/791,107 filed on Jan. 11, 2019, 62/806,050 filed on Feb. 15, 2019, KR Provisional Application Nos. 10-2019-0010091 filed on Jan. 25, 2019, and 10-2019-0037364 filed on Mar. 29, 2019, the contents of which are hereby incorporated by reference herein in their entirety.

BACKGROUNDS

Field of the Description

The disclosure relates to wireless communication.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or user equipments (UEs) sensitive to reliability and latency are under discussion. Introduction of next-generation RAT considering enhanced mobile broadband communication, massive MTC, and ultra-reliable and low-latency communication (URLLC) is under discussion. Iii the disclosure, for convenience of description, this technology may be referred to as new RAT or new radio (NR).

One potential technology intended to enable future cellular network deployment scenarios and applications is supporting wireless backhaul and relay links, which enables a flexible and highly dense deployment of NR cells without needing to proportionally densify a transport network. It allows for flexible and very dense deployment.

With massive MIMO or a native deployment of multi-beam system, a greater bandwidth (e.g., mmWave spectrum) is expected to be available in NR than in LTE, and thus occasions for the development and deployment of integrated access and backhaul links arise. This allows an easy deployment of a dense network of self-backhauled NR cells in an integrated manner by establishing a plurality of control and data channels/procedures defined to provide connection or access to UEs. This system is referred to as an integrated access and backhaul (IAB) link.

An IAB system may include a plurality of base stations and/or UEs, and methods of configuring or allocating resources for efficient transmission and reception between nodes and/or between a node and a UE are under discussion.

SUMMARY

An aspect of the disclosure is to provide a method and an apparatus for operating a communication node in a wireless communication system.

The disclosure provides an operating method of a communication node on a DU soft resource and methods related to priority determination of a dynamic MT configuration, data transmission on a DU resource in view of a priority, SSB transmission for an access user equipment (UE), SSB transmission for backhaul discovery/measurement, discovery/measurement of neighboring nodes, and a measurement gap for an IAB node.

According to the disclosure, there is provided a resource configuration determination method for efficient communication between IAB nodes and/or UEs in an IAB system. Accordingly, when there is a conflict between a plurality of configurations, an IAB node may autonomously select one configuration without waiting for a new configuration, thus performing communication. Therefore, overall throughput and communication efficiency of the IAB system may be increased.

Effects obtained through specific examples of this specification are not limited to the foregoing effects. For example, there may be a variety of technical effects that a person having ordinary skill in the related art can understand or derive from this specification. Accordingly, specific effects of the disclosure are not limited to those explicitly indicated herein but may include various effects that may be understood or derived from technical features of the disclosure.

DESCRIPTION OF EXEMPLARY EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Figure 1:
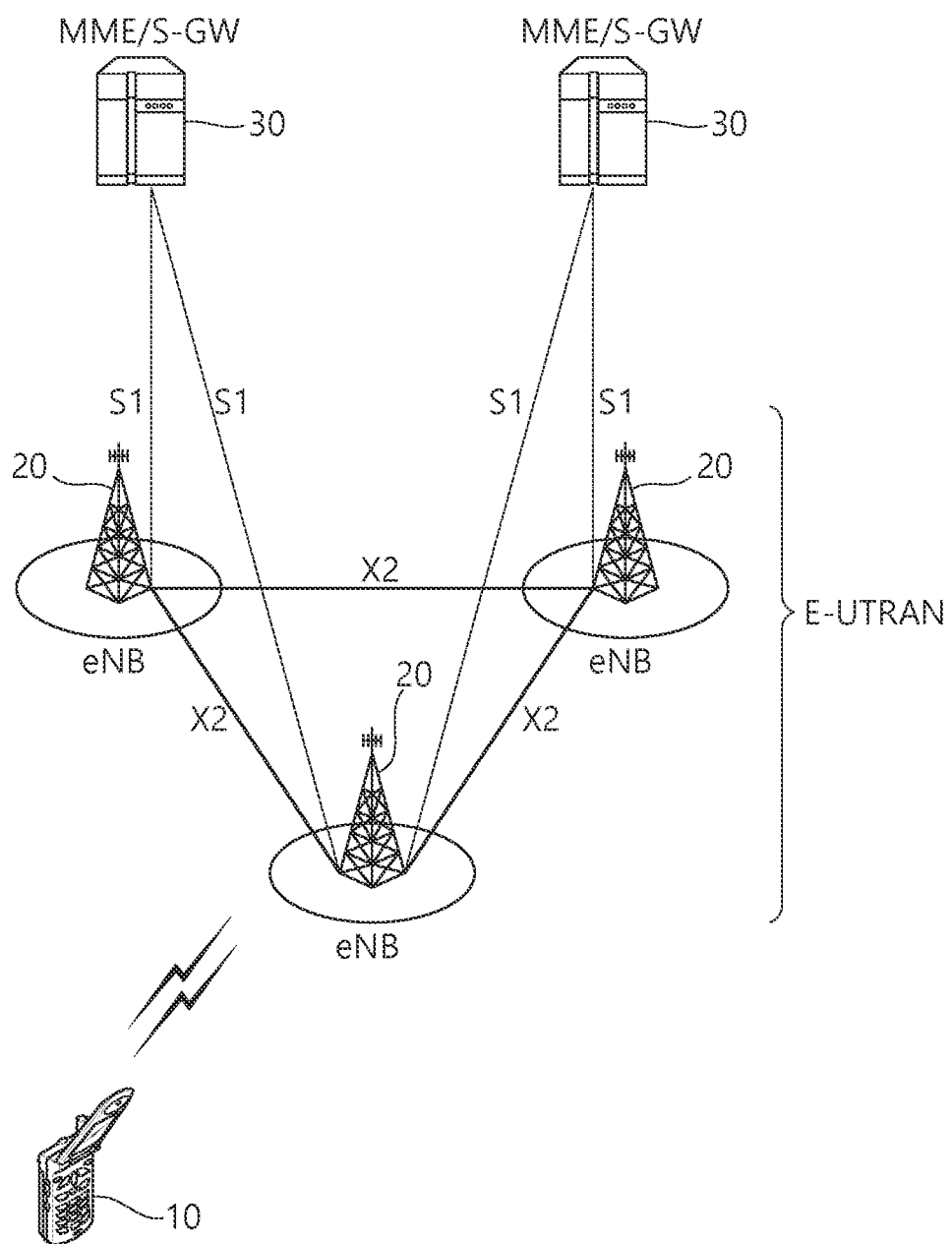
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
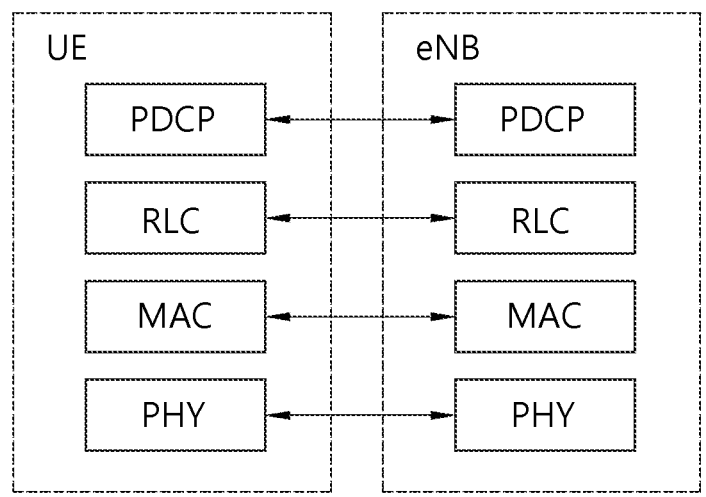
FIG. 2 is a diagram showing a wireless protocol architecture for a user plane.
Figure 3:
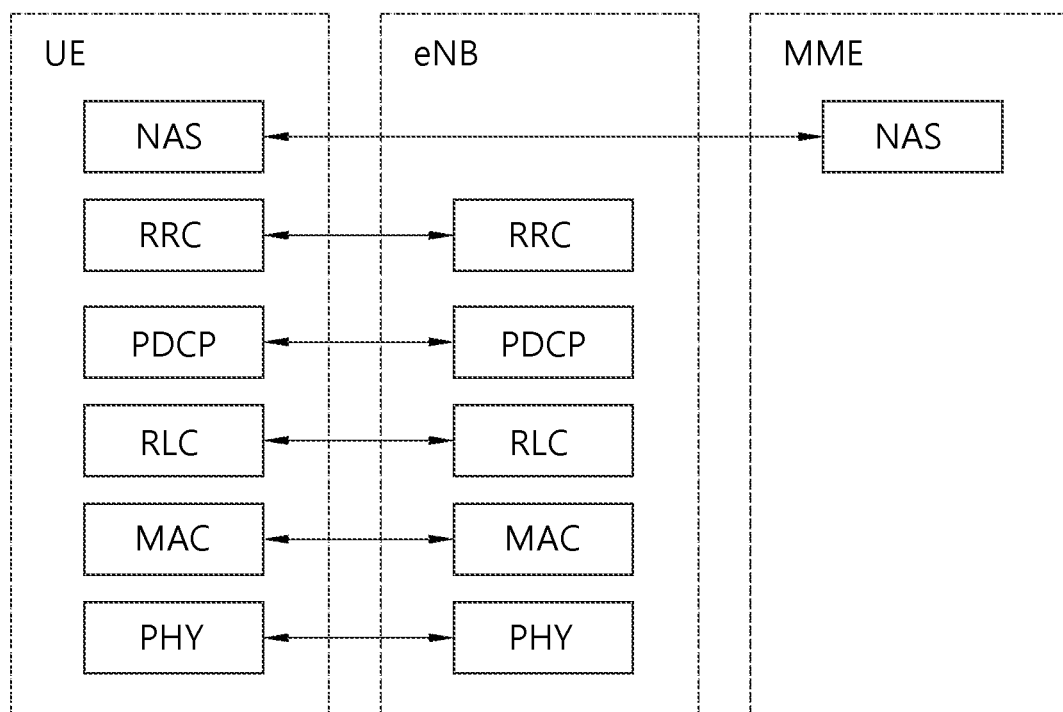
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
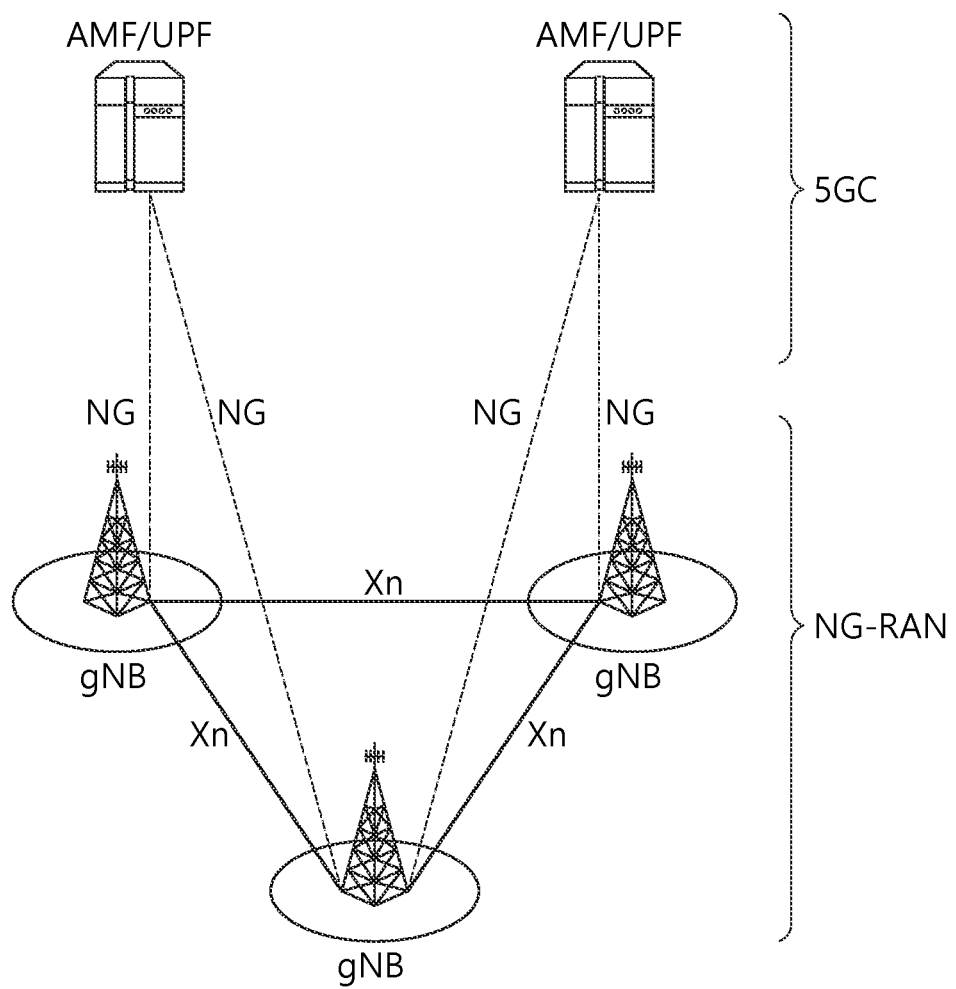
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
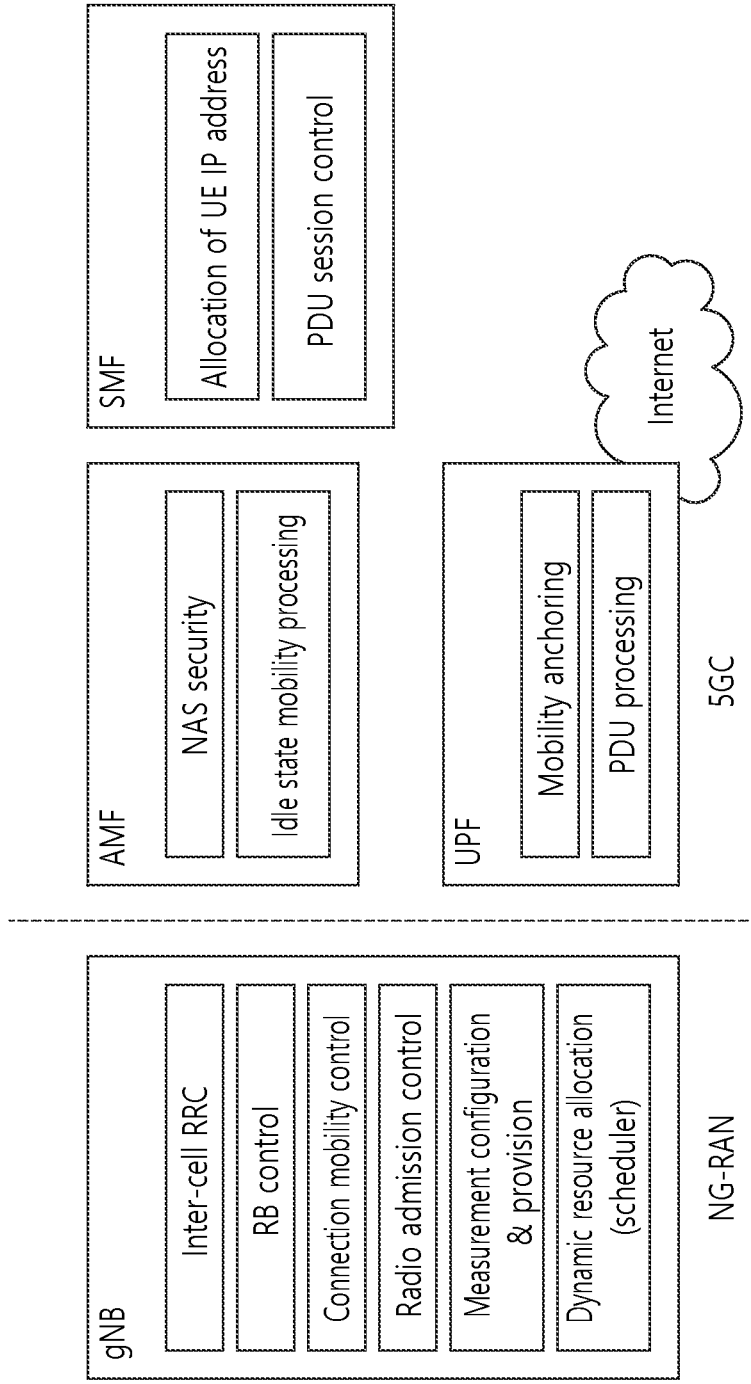
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
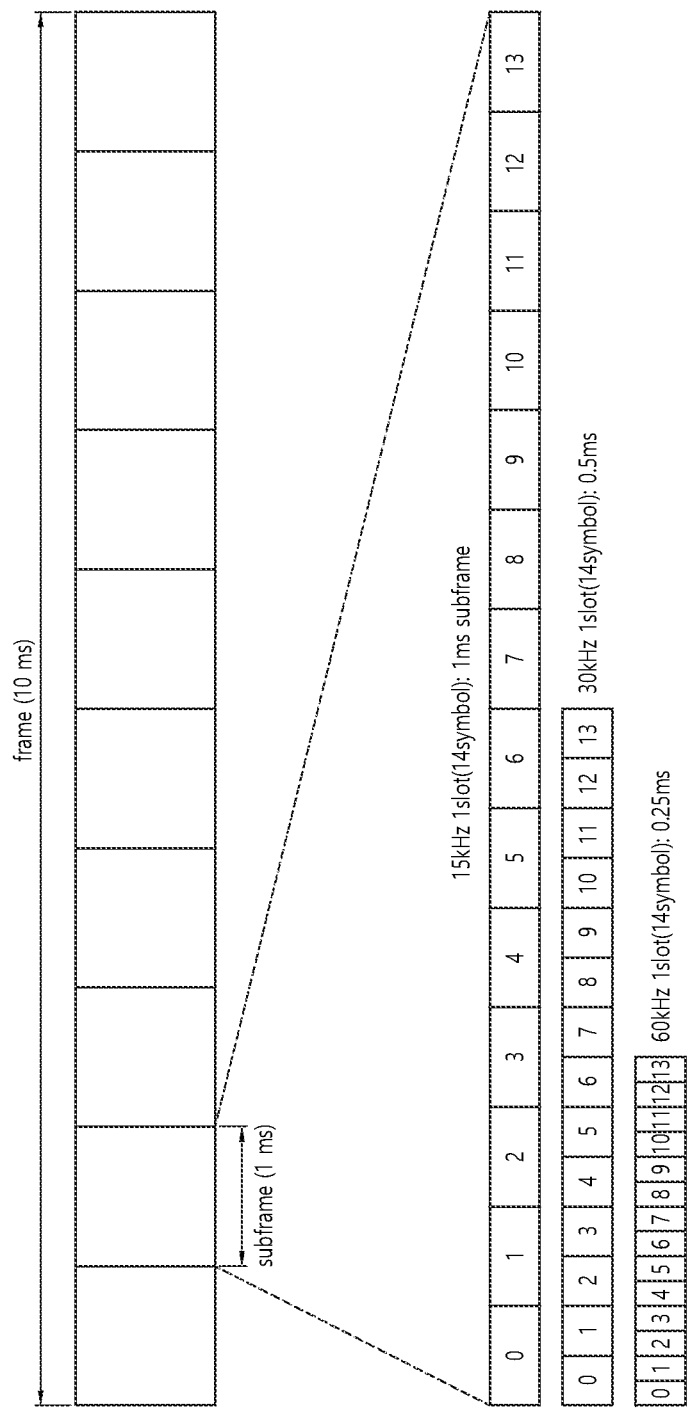
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration $\mu$.

TABLE 1

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
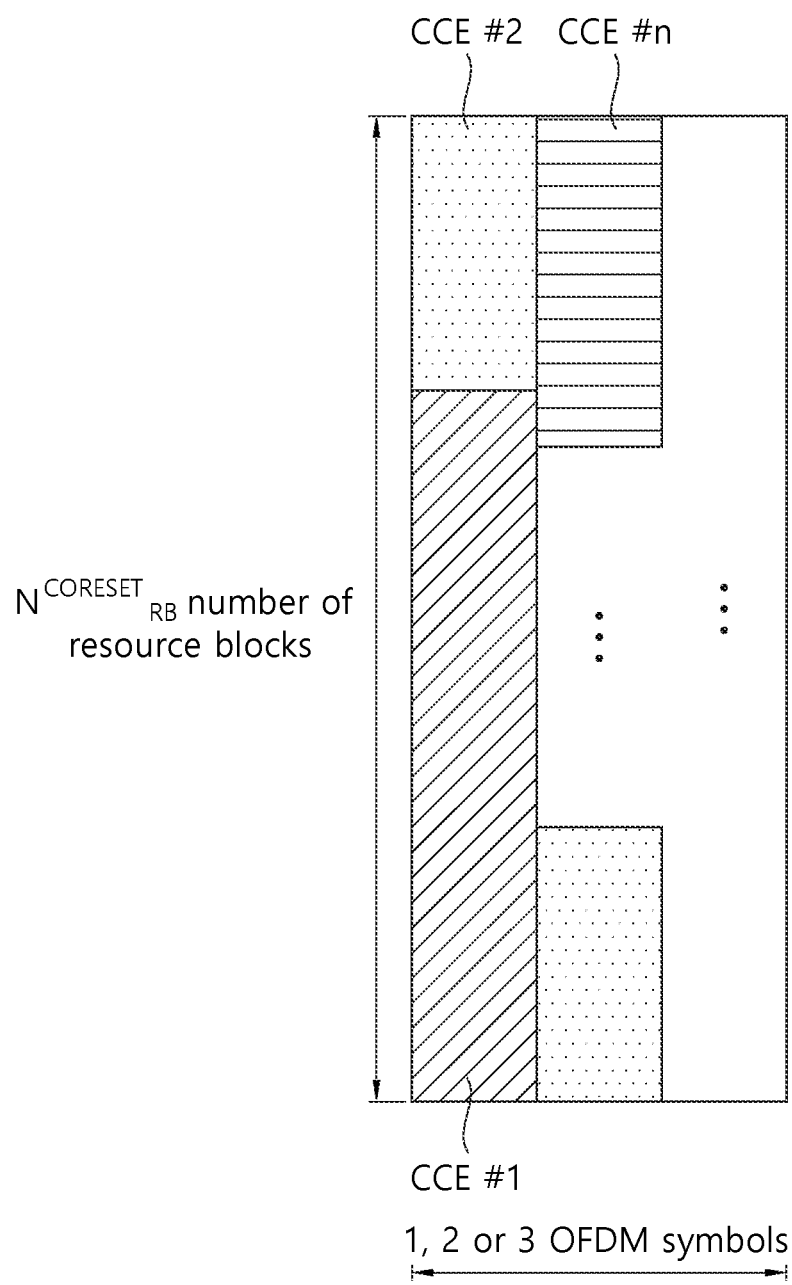
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
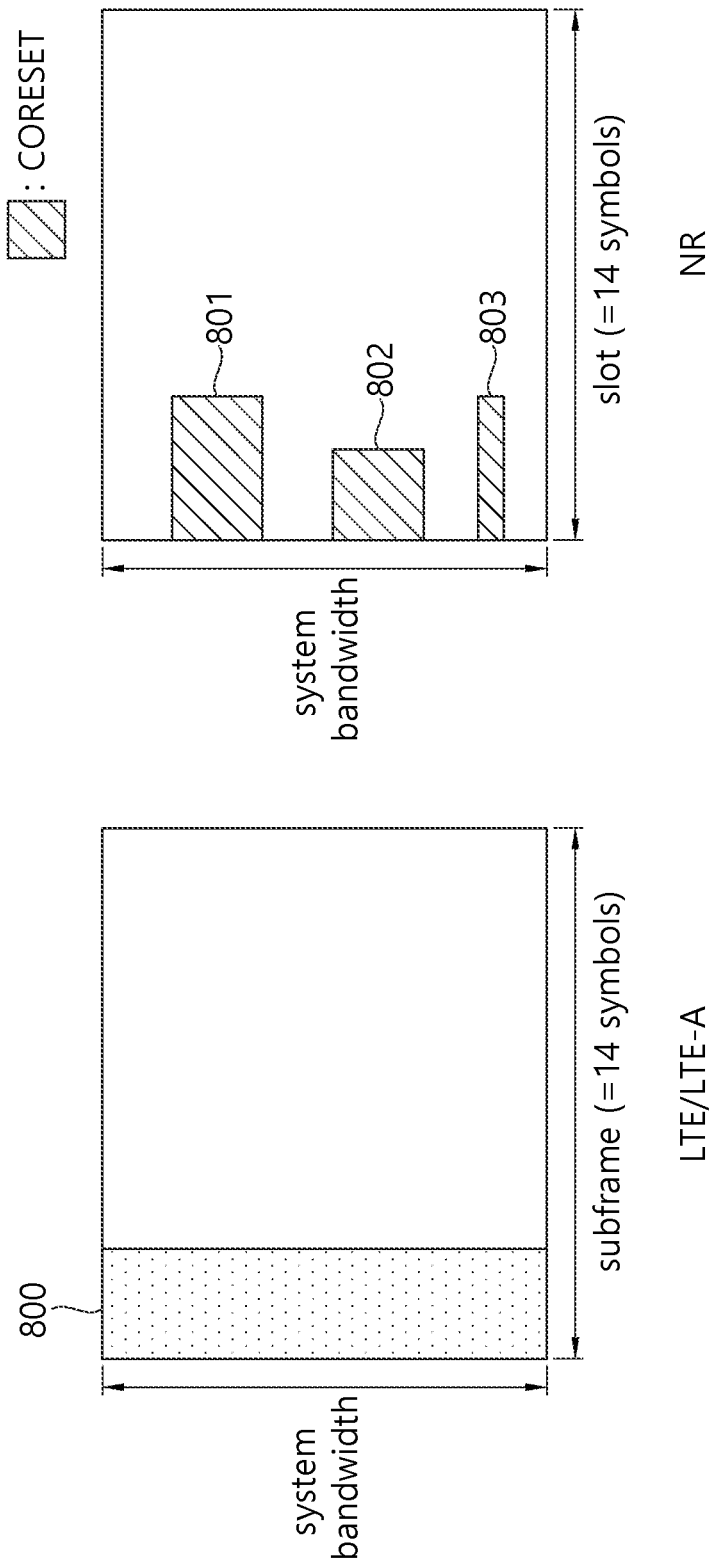
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
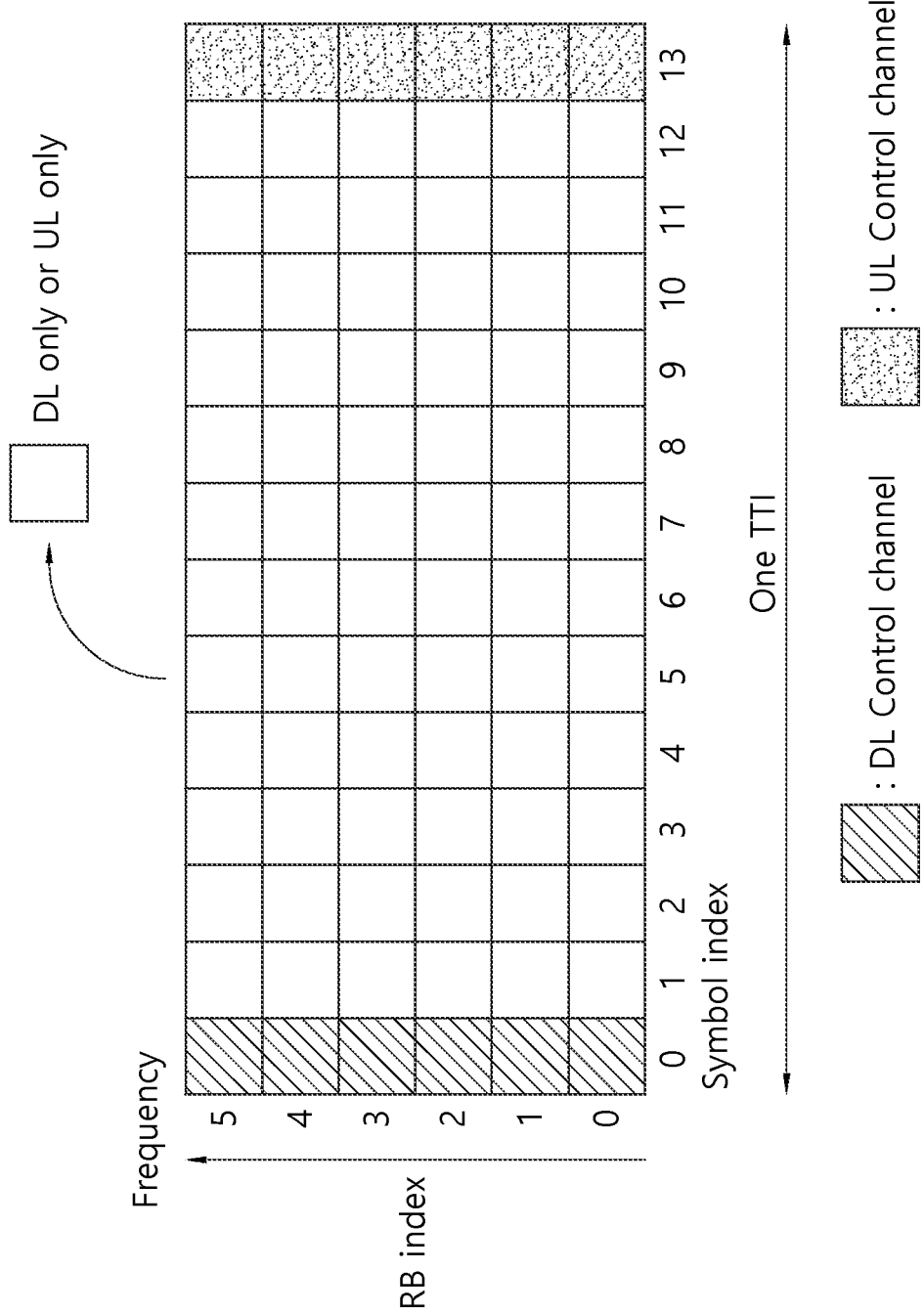
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
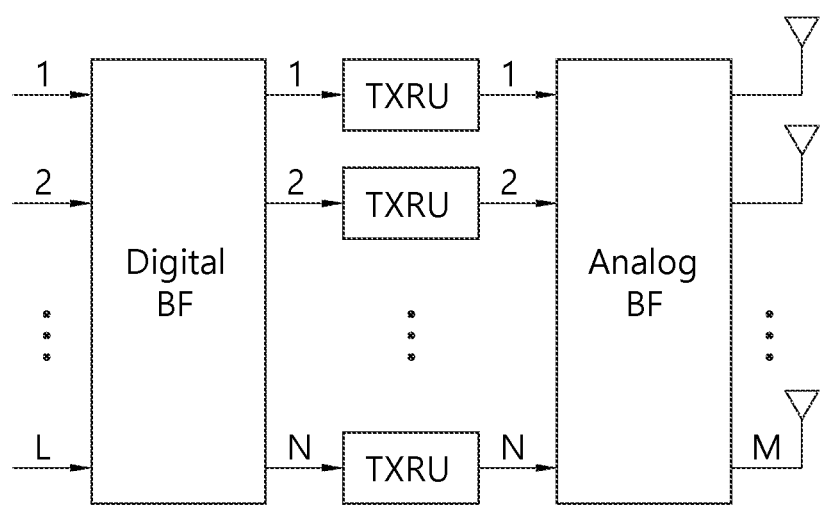
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
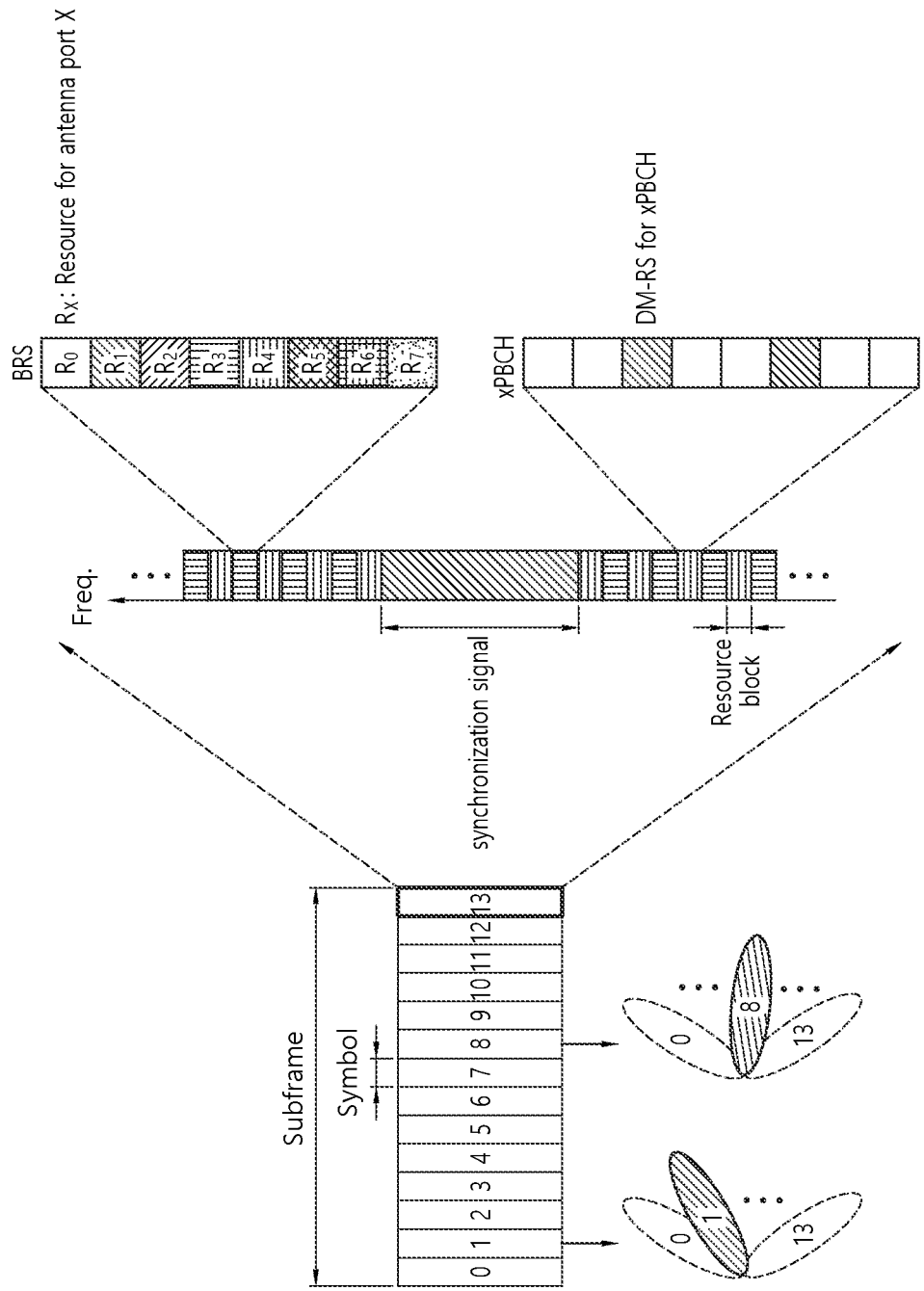
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successfully receive the synchronization signal or xPBCH.

Figure 12:
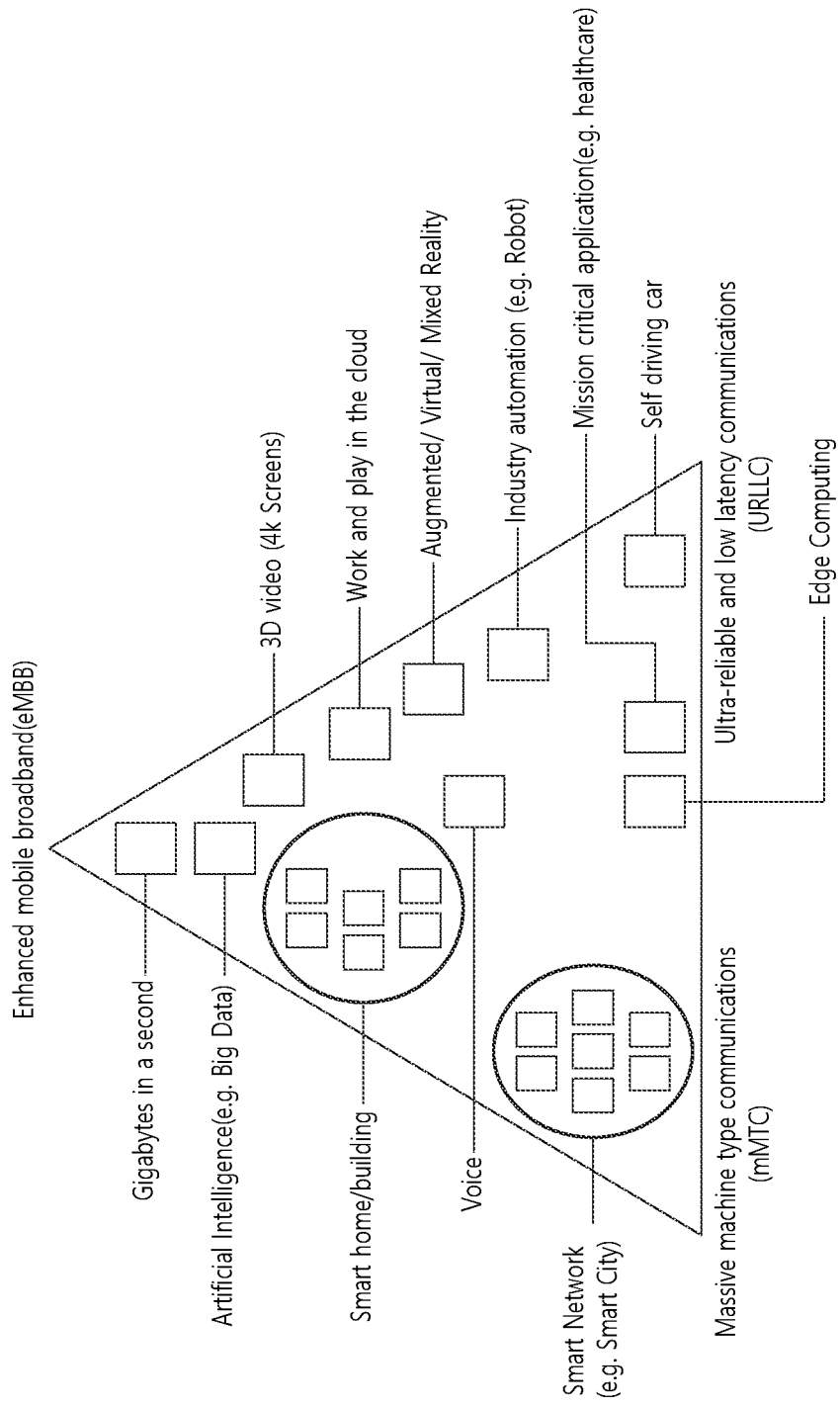
FIG. 12 shows examples of 5G usage scenarios to which the technical features of the present disclosure can be applied.

FIG. 12 shows examples of 5G usage scenarios to which the technical features of the present disclosure can be applied. The 5G usage scenarios shown in FIG. 12 are only exemplary, and the technical features of the present disclosure can be applied to other 5G usage scenarios which are not shown in FIG. 12.

Referring to FIG. 12, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 12 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Hereinafter, an integrated access and backhaul (IAB) link is described. For convenience of description, proposed methods are described with reference to a new RAT (NR) system. However, the proposed methods may also be applied to other systems including 3GPP LTE/LTE-A systems in addition to the NR system.

One potential technology intended to enable future cellular network deployment scenarios and applications is supporting wireless backhaul and relay links, which enables a flexible and highly dense deployment of NR cells without needing to proportionally densify a transport network. It allows for flexible and very dense deployment.

With massive MIMO or a native deployment of multi-beam system, a greater bandwidth (e.g., mmWave spectrum) is expected to be available in NR than in LTE, and thus occasions for the development and deployment of integrated access and backhaul links arise. This allows an easy deployment of a dense network of self-backhauled NR cells in an integrated manner by establishing a plurality of control and data channels/procedures defined to provide connection or access to UEs. This system is referred to as an integrated access and backhaul (IAB) link.

The following definitions are provided in the disclosure.

AC(x): Access link between node(x) and UE(s)

BH(xy): Backhaul link between node(x) and node(y)

Here, a node may refer to a donor gNB (DgNB) or a relay node (RN), where a DgNB or a donor node may be a gNB that provides a function of supporting a backhaul for IAB nodes.

In the disclosure, for convenience of description, when there are relay node 1 and relay node 2 and relay node 1 is connected to relay node 2 through a backhaul link to relay data transmitted to and received from relay node 2, relay node 1 is referred to as a parent node of relay node 2 and relay node 2 is referred to as a child node of relay node 1.

The following drawings are provided to explain specific examples of the present specification. Terms for specific devices illustrated in the drawings or terms for specific signals/messages/fields illustrated in the drawings are provided for illustration, and thus technical features of the present specification are not limited by the specific terms used in the following drawings.

Figure 13:
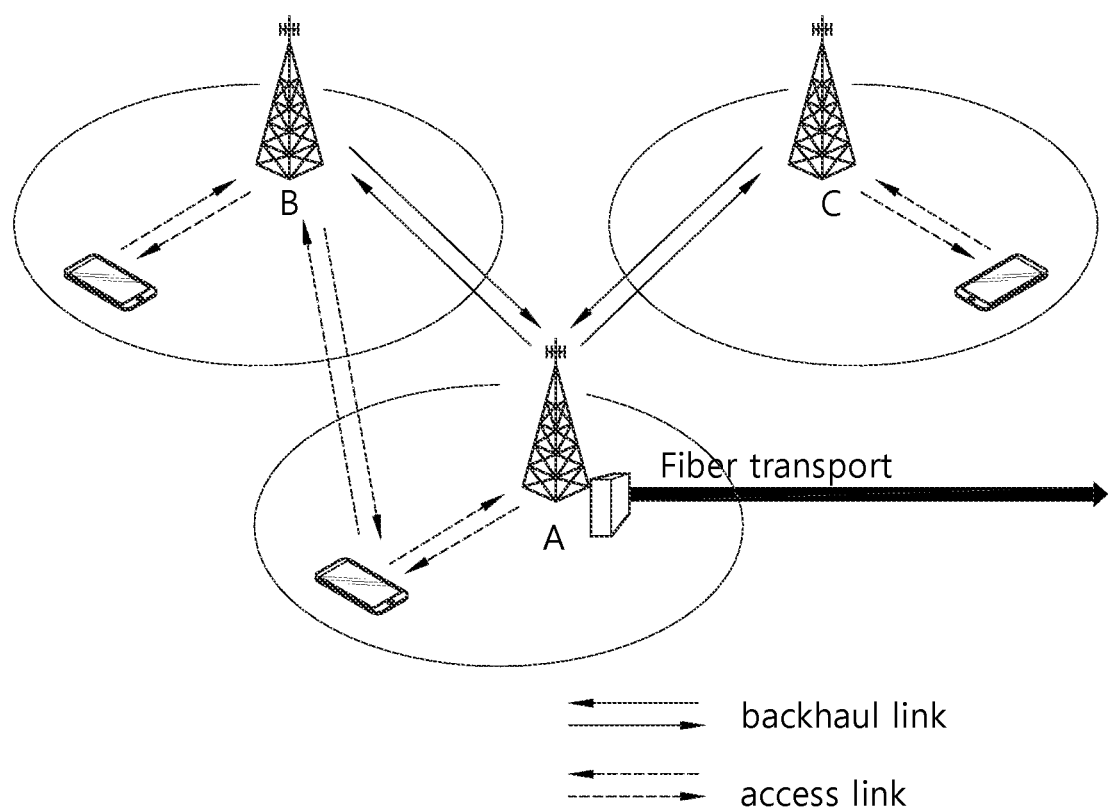
FIG. 13 schematically illustrates an example of a network having an integrated access and backhaul (TAB) link.

FIG. 13 schematically illustrates an example of a network having an integrated access and backhaul (IAB) link.

Referring to FIG. 13, relay nodes (rTRPs) may multiplex access and backhaul links in a time, frequency, or space domain (i.e., a beam-based operation).

Different links may operate on the same frequency or on different frequencies (which may be referred to as an in-band relay and an out-band relay, respectively). It is important to efficiently support out-band relays for some NR deployment scenarios, while it is crucial to understand requirements for an in-band operation involving close interworking with an access link operating on the same frequency to accommodate duplex constraints and to avoid/mitigate interference.

Furthermore, operating an NR system in a millimeter wave spectrum has unique challenges, including experiencing severe short-term blocking which may not be easily mitigated by a current RRC-based handover mechanism due to a greater scale of time required to complete the procedure than that for short-term blocking. To overcome short-term blocking in a millimeter wave system, a fast RAN-based mechanism for switching between rTRPs that does not necessarily require inclusion of a core network may be required. A demand for mitigation of short-term blocking for an NR operation in a millimeter wave spectrum, along with a demand for easier deployment of self-backhauled NR cells, raises a need for development of an integrated framework that allows fast switching of access and backhaul links. Over-the-air coordination between rTRPs may also be considered to mitigate interference and to support end-to-end path selection and optimization.

The following requirements and aspects need to be achieved by an IAB for NR.

Efficient and flexible operation for in-band and out-band relaying in indoor and outdoor scenarios Multi-hop and redundant connection End-to-end path selection and optimization Support of backhaul links with high spectral efficiency Support of legacy NR terminals;

Legacy NR is designed to support half-duplex devices. Thus, half duplex may be supported and useful in an IAB scenario. Furthermore, IAB devices with full duplex may also be considered.

In an IAB scenario, when each relay node (RN) does not have scheduling capability, a donor gNB (DgNB) needs to schedule all links between the DgNB, related relay nodes, and UEs. That is, the DgNB needs to determine scheduling of all the links by collecting traffic information from all the related relay nodes and needs to report scheduling information to each node.

On the other hand, distributed scheduling may be performed when each relay node has scheduling capability. Distributed scheduling enables immediate scheduling in response to an uplink scheduling request from a UE and allows a backhaul/access link to be flexibly used by reflecting surrounding traffic conditions.

Figure 14:
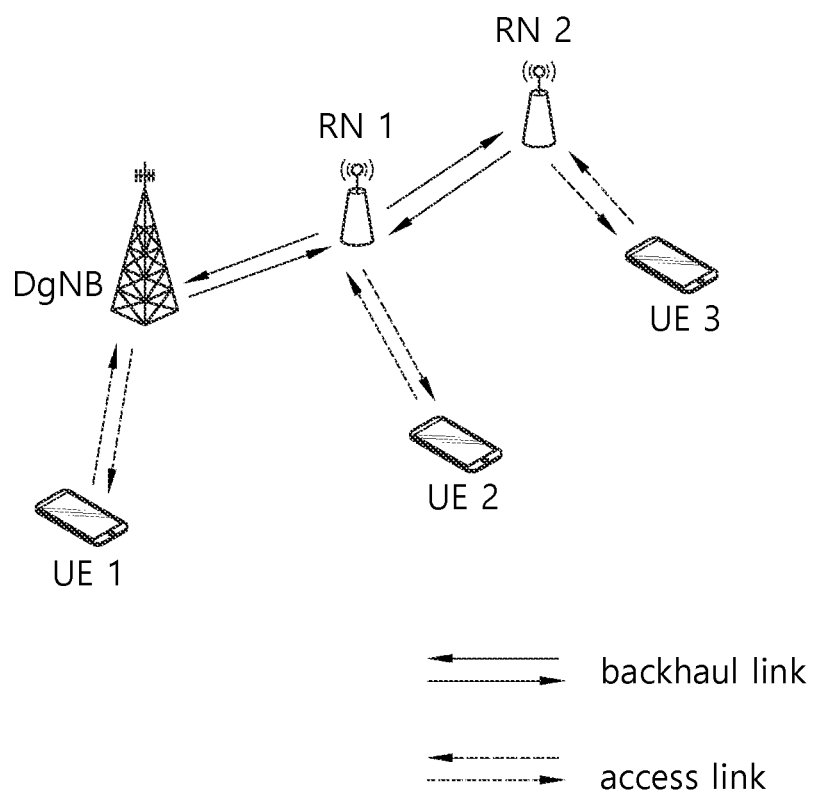
FIG. 14 schematically illustrates an example of the configuration of access and backhaul links.

FIG. 14 schematically illustrates an example of the configuration of access and backhaul links.

FIG. 14 shows an example in which a backhaul link and an access link are configured when there are a DgNB and IAB relay nodes (RNs). DgNB and RN1 are connected via a backhaul link, RN2 is connected to RN1 via a backhaul link, DgNB and UE1 are connected via an access link, RN1 and UE2 are connected via an access link, and RN2 and UE3 are connected via an access link.

Referring to FIG. 14, the DgNB receives not only a scheduling request from UE1 but also scheduling requests from UE2 and UE3. The DgNB determines scheduling of two back links and three access links and reports scheduling results. This centralized scheduling involves a scheduling delay and incurs latency.

On the other hand, distributed scheduling may be performed when each relay node has scheduling capability. Accordingly, it is possible to perform immediate scheduling in response to an uplink scheduling request from a UE terminal and to flexibly use backhaul/access links by reflecting surrounding traffic conditions.

Figure 15:
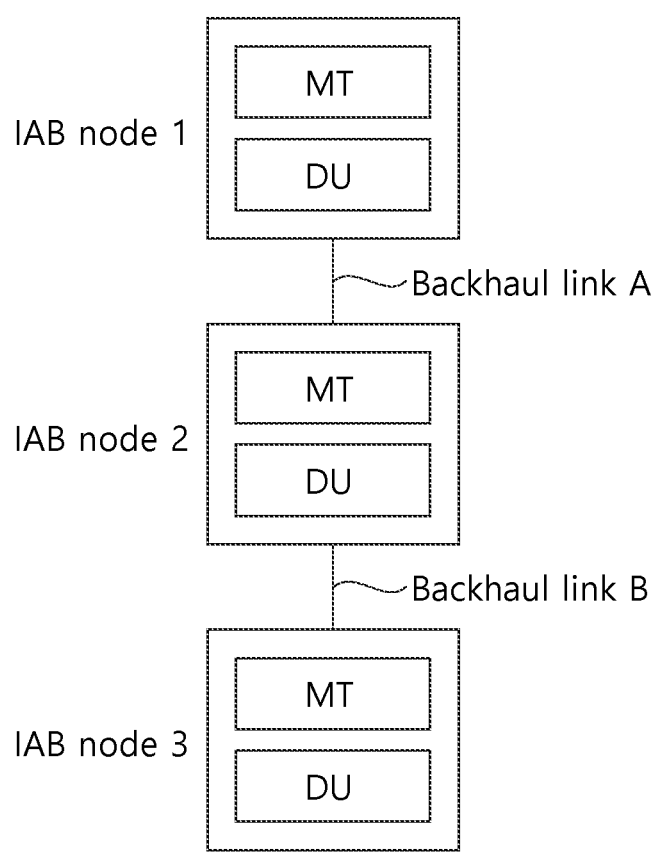
FIG. 15 illustrates a link and relationship between TAB nodes.

FIG. 15 illustrates a link and relationship between IAB nodes.

Referring to FIG. 15, IAB node 1 is connected with IAB node 2 through backhaul link A. With respect to backhaul link A, IAB node 1 is a parent node of IAB node 2, and IAB node 2 is a child node of IAB node 1. IAB node 2 is connected with IAB node 3 via backhaul link B. With respect to backhaul link B, IAB node 2 is a parent node of IAB node 3, and IAB node 3 is a child node of IAB node 2.

Here, each IAB node may perform two functions. One is a mobile termination (MT), which maintains a wireless backhaul connection to a higher IAB node or a donor node as, and the other is a distributed unit (DU), which provides an access connection with UEs or a connection with an MT of a lower IAB node.

For example, for IAB node 2, a DU of IAB node 2 functionally establishes backhaul link B with an MT of IAB node 3, and an MT of IAB node 2 functionally establishes backhaul link A with a DU of IAB node 1. Here, a child link of the DU of IAB node 2 may refer to backhaul link B between IAB node 2 and IAB node 3. A parent link of the MT of IAB node 2 may refer to backhaul link A between IAB node 2 and IAB node 1.

Figure 16:
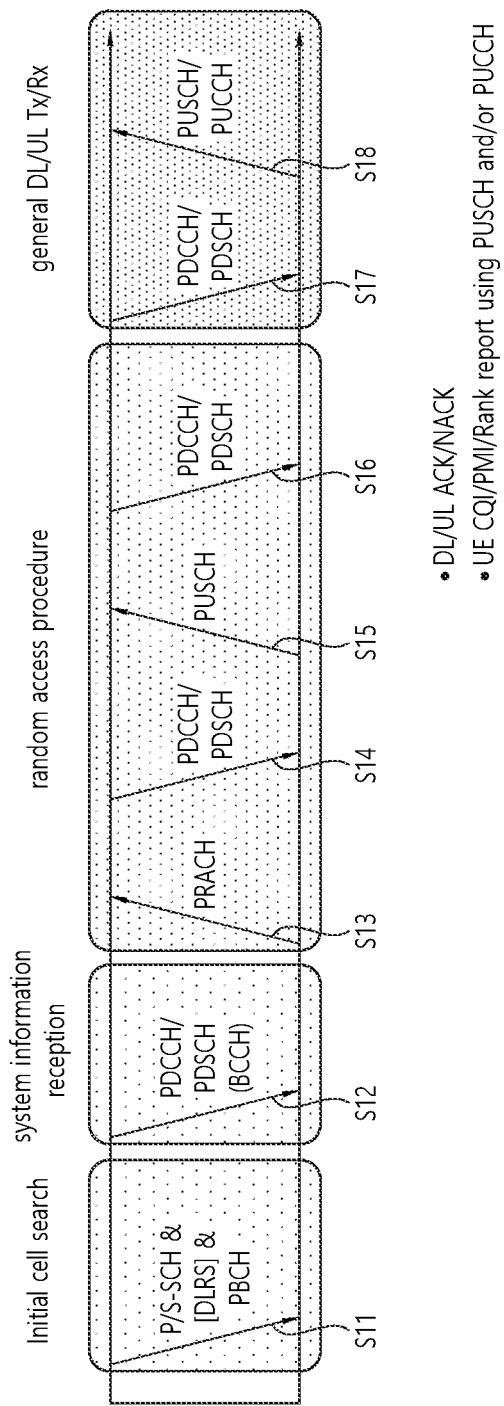
FIG. 16 illustrates physical channels and general signal transmission used in a 3GPP system.

FIG. 16 illustrates physical channels and general signal transmission used in a 3GPP system.

In a wireless communication system, a UE receives information from a base station through a downlink (DL) and transmits information to the base station through an uplink (UL). Information transmitted and received between the base station and the UE includes data and various pieces of control information, and various physical channels exist according to the type/use of the transmitted and received information.

When turned-off power is turned on again or the UE enters a new cell, the UE performs an initial cell search operation, such as synchronization with the base station (S11). To this end, the UE receives a primary synchronization channel (PSCH) and a secondary synchronization channel (SSCH) from the base station, synchronizes with the base station and obtains information, such as a cell identity. Further, the UE may receive a physical broadcast channel (PBCH) from the base station to obtain in-cell broadcast information. In addition, the UE may receive a downlink reference signal (DL RS) to check a downlink channel state in the cell initial cell search operation.

When the initial cell search is completed, the UE may receive a physical downlink control channel (PDCCH) and a physical downlink shared channel (PDSCH) corresponding to the PDCCH, thus obtaining more specific system information (S12).

Subsequently, the UE may perform a random access procedure to complete access to the base station (S13 to S16). In detail, the UE may transmit a preamble through a physical random access channel (PRACH) (S13), and may receive a random access response (RAR) in response to the preamble through a PDCCH and a PDSCH corresponding to the PDCCH (S14). Then, the UE may transmit a physical uplink shared channel (PUSCH) using scheduling information in the RAR (S15) and may perform a contention resolution procedure through a PDCCH and a PDSCH corresponding to the PDCCH (S16).

After performing this procedure, the UE may perform a general uplink/downlink signal transmission procedure of receiving a PDCCH/PDSCH (S17) and transmitting a PUSCH/physical uplink control channel (PUCCH) (S18). Control information transmitted from the UE to the base station is referred to as uplink control information (UCI).

UCI includes a hybrid automatic repeat and request acknowledgement/negative-ACK (HARQ ACK/NACK), a scheduling request (SR), channel state information (CSI), and the like. The CSI includes a channel quality indicator (CQI), a precoding matrix indicator (PMI), a rank indication (RI), and the like. UCI is generally transmitted through a PUCCH, but may be transmitted through a PUSCH when control information and data need to be transmitted at the same time. Further, the UE may aperiodically transmit UCI through a PUSCH according to a request/indication from a network.

Hereinafter, initial access of an IAB node is described.

An IAB node may follow the same initial access procedure as used for a UE including cell search, system information acquisition, and random access in order to initially establish a connection to a parent node or a donor node. SSB/CSI-RS-based RRM measurement is the start point of IAB node discovery and measurement.

A method for avoiding a collision in SSB configuration between IAB nodes and an inter-IAB discovery procedure applying the feasibility of discovering an IAB node on the basis of a CSI-RS, half-duplex constraints, and multi-hop topology need to be taken into consideration. In view of a cell ID used by a given IAB node, the following two cases may be considered.

Case 1: Donor node and IAB node share the same cell ID.
Case 2: Donor node and IAB node retain separate cell IDs.

Further, a mechanism for multiplexing RACH transmissions from UEs and RACH transmissions from IAB nodes also needs to be considered.

Hereinafter, backhaul link measurement is described.

It is necessary to consider measuring a plurality of backhaul links for link management and path selection. To support half-duplex constraints from the perspective of a given IAB node, IAB supports detecting and measuring candidate backhaul links (after initial access) using resources orthogonal to resources used an access UEs for cell detection and measurement. Here, the following aspects may be further considered.

TDM of a plurality of SSBs (e.g., according to hop order, cell ID, or the like)
SSB muting across IAB nodes
Multiplexing of SSBs for access UEs and IAB nodes in a half frame or across half frames
IAB node discovery signal (e.g., CSI-RS) that is TDMed with SSB transmission
Use of off-raster SSB
Transmission period for backhaul link detection and measurement, which is different from a period used by access UEs.

It is necessary to further consider a coordination mechanism for different solutions including a coordination mechanism for measurement time and reference signal (RS) transmission for IAB nodes.

It may be considered to enhance an SMTC and a CSI-RS configuration in order to support RRM measurement for IAB nodes.

Hereinafter, backhaul link management is described.

An IAB node supports a mechanism for detecting/recovering a backhaul link failure. It may be further considered to improve a radio link monitoring reference signal (RLM RS) and related procedures for IAB.

Hereinafter, a mechanism for path switching or transmission/reception in a plurality of backhaul links is described.

It is necessary to consider a mechanism for simultaneous and efficient path switching or transmission/reception in a plurality of backhaul links (e.g., a multi-Tx/Rx (TRP) operation and intra-frequency dual connectivity).

Hereinafter, scheduling of backhaul and access links is described.

Downlink transmission of an IAB node (i.e., transmission from the IAB node to a child IAB node served by the IAB node via a backhaul link and transmission from the IAB node to UEs served by the IAB node via an access link) may be scheduled by the IAB node itself. Uplink transmission of the IAB node (i.e., transmission from the IAB node to a parent IAB node thereof or a donor node via a backhaul link) may be scheduled by the parent IAB node or the donor node.

Hereinafter, multiplexing of backhaul and access links is described.

In IAB, an IAB node supports time-division multiplexing (TDM), frequency-division multiplexing (FDM), and spatial-division multiplexing (SDM) between access and backhaul links according to half-duplex constraints. It is necessary to consider an efficient TDM/FDM/SDM mechanism for access/backhaul traffic over a multi-hop considering the half-duplex constraints of the IAB node. For various multiplexing options, the following aspects may be further considered.

Mechanism for orthogonally partitioning time slots or frequency resources between access and backhaul links over one or a plurality of hops
Use of different DL/UL slot configurations for access and backhaul links
DL and UL power control enhancement and timing requirements to allow intra-panel FDM and SDM in backhaul and access links
Interference management including cross-link interference.

Hereinafter, resource coordination is described.

It is necessary to consider a mechanism for scheduling coordination, resource allocation, and path selection across an IAB node/donor node and a plurality of backhaul hops. It is necessary to support semi-static coordination of resources (frequency, time in terms of slot/slot format, or the like) for IAB nodes (in timescale of RRC signaling). The following aspects may be further considered.

Distributed or centralized coordination mechanism
Resource granularity (e.g., TDD configuration pattern) of a necessary signal
Exchange of layer-1 (L1) and/or layer-3 (L3) measurements between IAB nodes
Exchange of information about topology affecting the design of a physical layer of a backhaul link (e.g., hop order)
Coordination of resources (frequency, time in terms of slot/slot format, or the like) faster than semi-static coordination Hereinafter, IAB node synchronization and timing alignment are described.

It is necessary to consider the feasibility of over-the-air (OTA) synchronization and the effect of timing misalignment on IAB performance (e.g., the number of supportable hops). It is necessary to consider a mechanism for timing alignment over multi-hop NR-IAB networks. IAB supports timing advance (TA)-based synchronization between IAB nodes including a plurality of backhaul hops. It is necessary to further consider improving an existing timing alignment mechanism.

The following cases of transmission timing alignment between IAB nodes and donor nodes need to be further taken into consideration.

Case 1: DL transmission timing alignment over IAB nodes and donor nodes

Case 2: DL and UL transmission timing alignment within an IAB Node

Case 3: DL and UL reception timing alignment within an IAB Node

Case 4: Transmission in Case 2 during reception in Case 3 within an IAB node

Case 5: Case 1 for access link timing and Case 4 for backhaul link timing in different time slots The following levels of alignments need to be considered between an IAB node/donor node or within an IAB node:

Slot-level alignment

Symbol-level alignment

No alignment.

TDM/FDM/SDM of access and backhaul links, the impact of cross-link interference in different cases, and the impact of access UEs may be further considered.

Hereinafter, cross-link interference measurement and management is described.

The impact of cross-link interference (CLI) on access and backhaul links (including a plurality of hops) may be considered. Further, methods for interference measurement and management need to be considered.

Hereinafter, a CLI mitigation technique is described.

A CLI mitigation technique including advanced receiver and transmitter coordination needs to be considered, and priorities need to be determined in terms of complexity and performance. The CLI mitigation technique needs to be able to manage the following inter-IAB interference scenarios.

Case 1: A victim IAB node performs DL reception via an MT thereof, and an interfering IAB node performs UL transmission via an MT thereof Case 2: A victim IAB node performs DL reception via an MT thereof, and an interfering IAB node performs DL transmission via a DU thereof Case 3: A victim IAB node performs UL reception via a DU thereof, and an interfering IAB node performs UL transmission via an MT thereof Case 4: A victim IAB node performs UL reception via a DU thereof, and an interfering IAB node performs DL transmission via a DU thereof.

When a given IAB node performs FDM/SDM reception between access and backhaul links, interference experienced by the IAB node needs to be further taken into consideration.

Hereinafter, spectral efficiency enhancement is described.

It is necessary to consider supporting 1024 quadrature amplitude modulation (QAM) for a backhaul link.

Hereinafter, proposals of the disclosure are described.

Configurations, operations, and other features of the disclosure will be understood by embodiments of the disclosure described with reference to the accompanying drawings.

The disclosure is described assuming an in-band environment but may also be applied in an out-band environment. Further, the disclosure is described in consideration of an environment in which a donor-gNB (DgNB), a relay node (RN), and/or a UE perform a half-duplex operation but may also be applied in an environment a DgNB, an RN, and/or a UE perform a full-duplex operation.

A discovery signal mentioned in the disclosure refers to a signal transmitted by an IAB so that another IAB node or a UE can discover the IAB.

The discovery signal may be in the form of a synchronization signal/physical broadcast channel (PBCH) block or a synchronization signal block (SSB) of NR, in the form of a channel status information-reference signal (CSI-RS), or in the form of a different signal of NR. Alternatively, the discovery signal may be a newly designed signal.

The disclosure mainly illustrates an IAB node discovering other IAB nodes but may also be applied to a case where a UE discovers IAB nodes.

From an MT perspective of an IAB node, the following time-domain resources may be indicated for a parent link.

Downlink (DL) time resource

Uplink (UL) time resource

Flexible (F) time resource

From a DU perspective of an IAB node, a child link has the following time resource types.

Downlink (DL) time resource

Uplink (UL) time resource

Flexible (F) time resource

Not-available (NA) time resource (resource not used for communication via a DU child link)

Each of a downlink time resource, an uplink time resource, and a flexible time resource for a DU child link may belong to one of the following two categories.

Hard resource: A time resource that is always available for a DU child link

Soft resource: A time resource the availability of which for a DU child link is explicitly or implicitly controlled by a parent node The above classification is only for illustration. Alternatively, from a DU perspective of an IAB node, resource types may be classified into UL, DL, F, and availability settings may be classified into NA, a hard resource, and a soft resource. In detail, the IAB node may receive resource configuration information, and the resource configuration information may include link direction information and availability information. Here, the link direction information may indicate whether the type of a specific resource is UL, DL, or F, and the availability information may indicate whether the specific resource is a hard resource or a soft resource. Alternatively, the link direction information may indicate whether the type of a specific resource is UL, DL, F or NA, and the availability information may indicate whether the specific resource is a hard resource or a soft resource.

As described above, from a DU perspective of an IAB node, there are four types of time resources, which are DL, UL, F and NA, for a child link from. An NA time resource refers to a resource that is not used for communication on a DU child link.

Each of DL, UL, and F time resources for the DU child link may be either a hard resource or a soft resource. A hard resource may refer to a resource that is always available for communication on the DU child link. A soft resource may be a resource the availability of which for communication on the DU child link is explicitly and/or implicitly controlled by a parent node.

In this specification, a configuration about the link direction and the link availability of a time resource for a DU child link may be referred to as a DU configuration. The DU configuration may be used for effective multiplexing and interference handling between IAB nodes. For example, the DU configuration may be used to indicate which link is a valid link for a time resource between a parent link and a child link. Further, the DU configuration may be established such that only a subset of child nodes uses a time resource for a DU operation, thus being used for interference coordination between the child nodes. In view of this aspect, the DU configuration may be effective when established semi-statically.

An MT of an IAB node may have three types of time resources, which are DL, UL, and F, for a parent link thereof similarly to a slot format indication (SFI) configuration for an access link.

Figure 17:
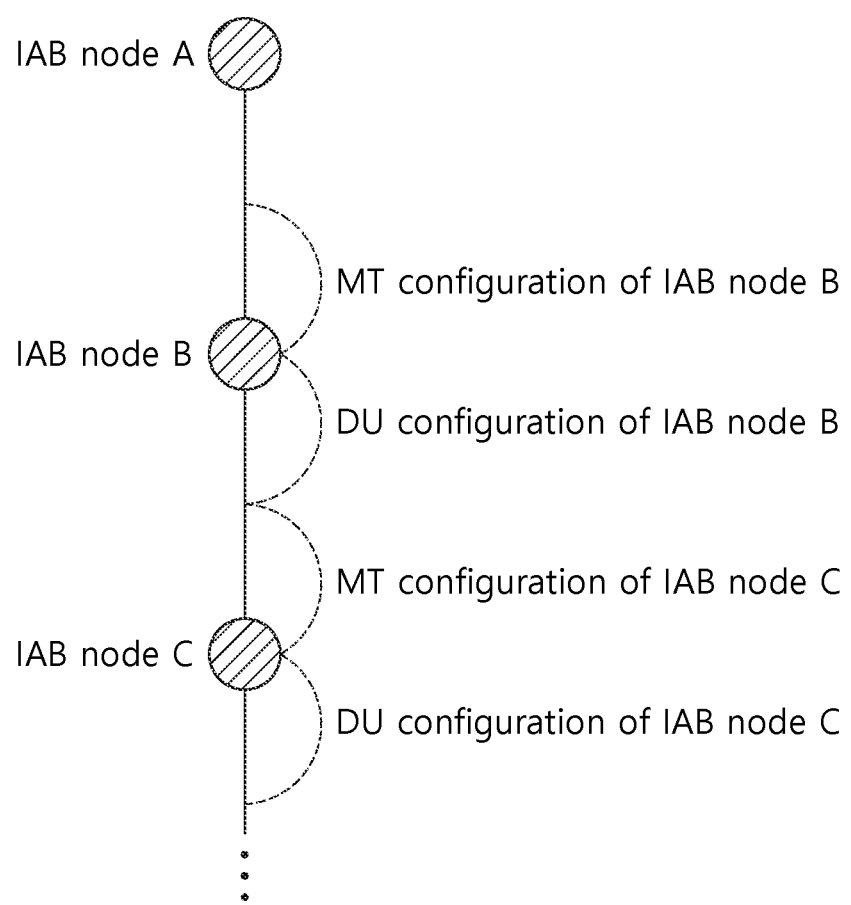
FIG. 17 illustrates an MT configuration and a DU configuration.

FIG. 17 illustrates an MT configuration and a DU configuration.

Referring to FIG. 17, there are IAB node A, IAB node B, and IAB node C, a parent node of IAB node B is IAB node A, and a child node of IAB node B is IAB node C.

Referring to FIG. 17, an IAB node may receive an MT configuration indicating link direction information about a parent link between a parent node thereof and the IAB node for communication with the parent node. In addition, the IAB node may receive a DU configuration indicating link direction and availability information that can be used for communication with a child node thereof.

For example, an MT configuration of IAB node B may include link direction information about a link between IAB node A and IAB node B from the perspective of IAB node B, and a DU configuration of IAB node B may include link direction and availability information about a link between IAB node B and IAB node C from the perspective of IAB node B. Further, an MT configuration of IAB node C may include the link direction of a link between IAB node B and IAB node C from the perspective of IAB node C, and a DU configuration of IAB node C may include link direction and availability information about a link between a child node of IAB node C or a UE connected to IAB node C and IAB node C from the perspective of IAB node C.

Here, for example, an operation performed by IAB node B with respect to a child node thereof, which is IAB node C, may be referred to as a DU operation of IAB node B. Further, an operation performed by IAB node B with respect to a parent node thereof, which is IAB node A, may be referred to as an MT operation of IAB node B.

Referring to FIG. 17, a DU resource of IAB node B may refer to a resource of IAB node B for the link between IAB node B and IAB node C. The link direction and the availability of the DU resource of IAB Node B may be determined on the basis of the DU configuration received by IAB Node B. Further, an MT resource of IAB node B may refer to a resource of IAB node B for the link between IAB node B and IAB node A. The link direction of the MT resource of IAB Node B may be determined on the basis of the MT configuration received by IAB Node B.

Hereinafter, proposals of the disclosure are described in detail.

First, an operating method of an IAB node on a DU soft resource is described.

Availability information about a resource configured as a soft resource according to a DU configuration may be set by dynamic L1-signaling. The availability information about the soft resource may be as follows.

Indicated as available (IA): Explicitly or implicitly indicates that a DU resource is available.

Indicated as not-available (INA): Explicitly or implicitly indicates that a DU resource is unavailable.

For example, the availability information about the soft resource may indicate only an available resource. That is, only resources indicated by the availability information about the soft resource may be available resources.

In the disclosure, L1-signaling including availability information about a DU soft resource is referred to as a dynamic soft resource configuration. In a soft resource before an IAB node receives a dynamic soft resource setting or in a soft resource not determined as available or unavailable by a dynamic soft resource configuration, the IAB node may operate as follows.

[Method 1-1] It is assumed that the DU soft resource is configured as INA. In this case, an MT operation has a higher priority than a DU operation in the soft resource. That is, the IAB node may perform an MT operation on the soft resource.

[Method 1-2] It is assumed that the DU soft resource is configured as IA. In this case, a DU operation has a higher priority than an MT operation in the soft resource. That is, the IAB node may perform a DU operation on the soft resource.

[Method 1-3] The IAB node performs an MT operation on a specific DU soft resource and performs a DU operation on the remaining DU soft resource. Here, the DU soft resource for performing the MT operation may include all or some of the following.

Resource configured for an MT downlink operation by a semi-static MT downlink configuration (e.g., a PDCCH monitoring resource, a CSI-RS transmission resource, a physical downlink shared channel (PDSCH) transmission resources, or the like)

Resource configured for an MT uplink operation by a semi-static MT uplink configuration (e.g., a grant-free resource, a transmission resource for a physical uplink control channel (PUCCH) and a physical uplink shared channel (PUSCH) configured via a higher layer, a sounding reference signal (SRS) transmission resource, a physical random access channel (PRACH) resources, or the like)

Resource configured for an MT downlink operation by a dynamic MT downlink configuration (e.g., a dynamic PDSCH transmission resource, an aperiodic CSI-RS transmission resource, an aperiodic tracking reference signal (TRS) transmission resource, or the like)

Resource configured for an MT uplink operation by a dynamic MT uplink configuration (e.g., a dynamic PUSCH transmission resource, an aperiodic SRS transmission resource, an aperiodic scheduling request (SR) transmission resource, or the like)

[Method 1-4] It is assumed that the DU soft resource is configured as INA in a PDCCH monitoring resource. In this case, an MT operation has a higher priority than a DU operation in the soft resource. That is, the IAB node performs an MT operation on the soft resource, which is for the IAB node to receive DCI including a dynamic soft resource configuration via a soft resource before receiving a dynamic soft resource configuration or via a soft resource IA/INA of which is not determined by a dynamic soft resource configuration. In addition, an MT operation may also have a higher priority than a DU operation in a resource dynamically configured for DL/UL transmission to an MT by a DL grant/UL grant.

Figure 18:
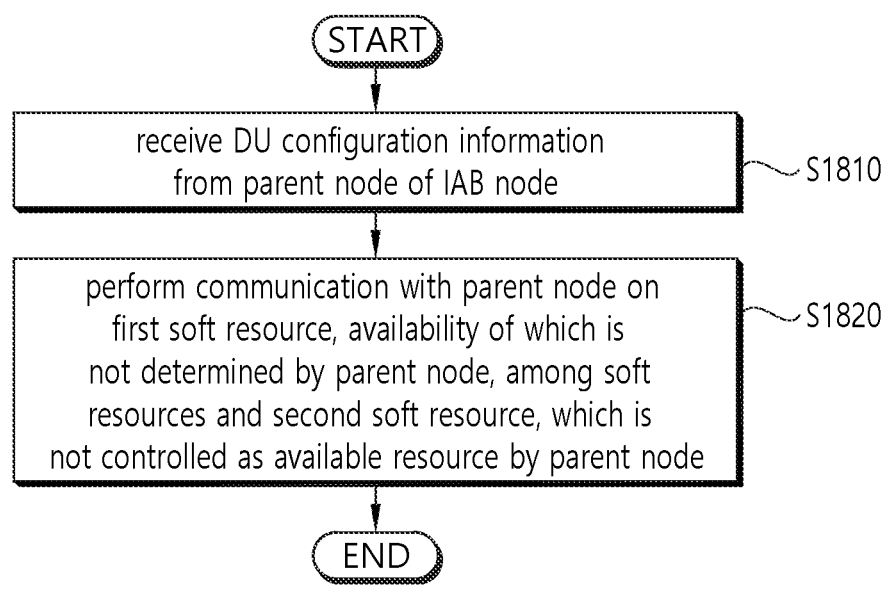
FIG. 18 is a flowchart illustrating an example of a communication method performed by an TAB node according to some embodiments of the disclosure.

FIG. 18 is a flowchart illustrating an example of a communication method performed by an IAB node according to some embodiments of the disclosure. Specifically, FIG. 18 illustrates a case where [Method 1-1] is applied.

Referring to FIG. 18, the IAB node receives DU configuration information from a parent node of the IAB node (S1810). Here, the DU configuration information may indicate the link direction and the availability of a resource of the IAB node for a link between a child node of the IAB node and the IAB node. For example, the DU configuration information may indicate a soft resource to the IAB node.

The IAB node performs communication with the parent node on a first soft resource, the availability of which is not determined by the parent node, among the soft resources and a second soft resource, which is not controlled as an available resource by the parent node (S1820).

Specifically, when the IAB node receives the DU configuration information, the IAB node may obtain information about the link direction (e.g., downlink, uplink, or flexible) and availability (e.g., unavailable, soft resource, or hard resource) of a resource available for communication with the child node of the IAB node. Here, the availability of a soft resource among the resources available for the communication with the child node may be finally determined by control of the parent node of the IAB node. The control may be performed by L1 signaling, such as DCI.

Here, the IAB node may fail to receive control information (e.g., L1 signaling) about the soft resource after receiving the DU configuration information, or the availability of the soft resource may not be determined by the control information. In this case, according to FIG. 18, the TAB node may perform an MT operation rather than a DU operation on the resource.

Figure 19:
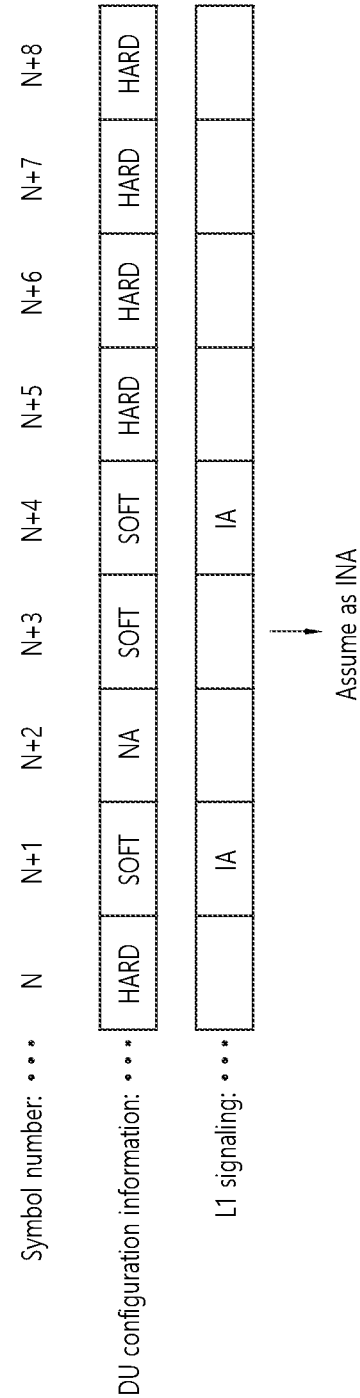
FIG. 19 illustrates an example of a communication method performed by an TAB node according to some embodiments of the disclosure.

FIG. 19 illustrates an example of a communication method performed by an TAB node according to some embodiments of the disclosure.

In FIG. 19, it is assumed that the TAB node receives DU configuration information. Referring to FIG. 19, the resource direction (not shown) and the availability of symbols N to N+8 are set by the DU configuration information. Here, symbol N+1, symbol N+3, and symbol N+4 are configured as soft resources for the IAB node on the basis of the DU configuration information.

The TAB node may receive L1 signaling from a parent node thereof. The L1 signaling may indicate whether symbol N+1, symbol N+3, and symbol N+4 configured as soft resources are available. FIG. 19 illustrates an example in which L1 signaling indicates only an available soft resource among soft resources.

Referring to FIG. 19, symbol N+1 and symbol N+4 are determined as available resources by L1 signaling, whereas the availability of symbol N+3 is not determined by L1 signaling. In this case, according to [Method 1-1], the TAB node assumes that symbol N+3 is an unavailable soft resource. That is, the TAB node assumes that the TAB node cannot perform a DU operation, that is, communication with a child node of the IAB node, on symbol N+3. Accordingly, the TAB node performs an MT operation, that is, communication with a parent node of the TAB node, on symbol N+3.

Next, the priority of a dynamic MT configuration is described.

By a dynamic configuration, an IAB node may be configured to perform an MT operation on a resource configured for a DU operation by a DU configuration. The resource configured for the DU operation may refer to a DU hard resource or a DU soft resource indicated as IA. For example, PDSCH transmission or PUSCH transmission to an MT may be configured through a DL grant/UL grant. In this case, the IAB node may operate as follows.

[Method 2-1] The IAB node drops transmission and reception to the MT and performs an operation as a DU.

[Method 2-2] The IAB node performs transmission and reception to the MT in a DU soft resource and drops transmission and reception to the MT in a DU hard resource drops. That is, when data transmission and reception is dynamically scheduled, the IAB node may (temporarily) override a dynamic soft resource configuration (temporarily) as INA in a corresponding resource. Alternatively, the IAB node may disregard the dynamic soft resource configuration and may consider the resource as an unavailable (INA) resource.

[Method 2-3] The IAB node performs transmission and reception to the MT. That is, when data transmission and reception to the MT is dynamically scheduled, the IAB node may (temporarily) override a DU configuration as NA in a corresponding resource. Alternatively, the IAB node may disregard the DU configuration and may consider the resource as an unavailable (NA) resource.

The foregoing methods may also be applied to a dynamically configured MT operation which is not data scheduling.

Next, data transmission on a DU priority resource is described.

By the foregoing methods, data, such as a PDSCH and a PUSCH, from a parent node to an MT of an IAB node may be scheduled including a resource for performing a DU operation. For example, when a PDSCH is scheduled to be transmitted through five symbols, if a DU operation has a higher priority in some of the resources, the PDSCH may not be received. Thus, when resources scheduled for a PDSCH and a PUSCH include a resource configured for a DU operation, the IAB node may operate as follows.

[Method 3-1] The IAB node drops PDSCH reception and PUSCH transmission. That is, even when an MT operation is impossible only in some resources, the IAB node drops PDSCH reception and PUSCH transmission.

[Method 3-2] The IAB node punctures PDSCH reception and PUSCH transmission in the resource configured for the DU operation. That is, in the case of the PDSCH, the IAB node receives the PDSCH assuming that the PDSCH is punctured in the resource configured for the DU operation. In the case of the PUSCH, the IAB node transmits the PUSCH by puncturing the PUSCH in the resource configured for the DU operation.

[Method 3-3] The IAB node rate-matches PDSCH reception and PUSCH transmission in the resource configured for the DU operation. That is, in the case of the PDSCH, the IAB node receives the PDSCH assuming that the PDSCH is rate-matched in the resource configured for the DU operation. In the case of the PUSCH, the IAB node transmits the PUSCH by rate-matching the PUSCH in the resource configured for the DU operation.

[Method 3-4] When the ratio of resources configured for the DU operation in a resource region scheduled for the PDSCH/PUSCH is a specific value or greater, the IAB node drops PDSCH reception and PUSCH transmission. When the ratio of resources configured for the DU operation in the resource region scheduled for the PDSCH/PUSCH is less than the specific value, the IAB node performs PDSCH reception and PUSCH transmission by puncturing or rate-matching.

Next, an SSB for an access UE is described.

A DU of an IAB node transmits an SSB for an access terminal or an access UE (i.e., an access SSB). Here, the access UE attempts to receive the SSB assuming that the SSB is periodically transmitted from the IAB node. Here, for example, when the IAB node is configured to perform an operation as an MT rather than an operation as a DU in a resource for transmitting the SSB, the IAB node may not transmit the SSB to the access UE. In this case, the IAB node may not transmit the SSB in a resource via which the access UE expects that the SSB is transmitted. The disclosure proposes a method for solving this problem.

[Method 4-1] Transmission of an access SSB always has a higher priority.

(Method 4-1-a) The DU of the IAB node may transmit the SSB for the access UE in the resource for transmitting the SSB for the access UE regardless of a DU configuration thereof. That is, the SSB for the access UE may be transmitted even in a resource that is not available for transmission to the DU by the DU configuration. In this case, when the operation as the MT and the operation as the DU are subjected to TDM, the operation as the MT cannot be performed in the resource.

(Method 4-1-b) The DU of the IAB node may assume that the resource (e.g., an OFDM symbol or slot) for transmitting the SSB for the access UE is always configured as a DL and/or hard resource in a DL configuration regardless of a DU configuration assigned thereto.

(Method 4-1-a) transmits the SSB in the resource for transmitting the SSB, while (Method 4-1-b) can transmit various downlink signals (e.g., a downlink data signal, a downlink control signal, an SSB, or the like) assuming that the resource for transmitting the SSB is a hard resource.

[Method 4-2] Whether to transmit the access SSB depends on a DU configuration.

(Method 4-2-a) The DU of the IAB node can transmit the access SSB only when the DU of the IAB node can transmit the access SSB in the resource for transmitting the SSB for the access UE according to a semi-static DU configuration assigned thereto. The semi-static DU configuration may refer to a configuration about a link direction and/or availability per time domain for the DU assigned through an F1-application protocol (F1-AP), system information (SI), and/or RRC. That is, the DU of the IAB node can transmit the access SSB only in a resource configured as a DL and hard resource according to the DU configuration and cannot transmit the access SSB in a different resource.

(Method 4-2-b) When the DU of the IAB node cannot transmit the access SSB in the resource for transmitting the SSB for the access UE according to a semi-static DU configuration assigned thereto, the DU of the IAB node may not transmit the access SSB. A resource not available for transmission of the access SSB according to the semi-static DU configuration may include the following resources.

NA resource

UL hard/soft resource

In this case, when the resource for transmitting the SSB for the access UE is a flexible resource, the DU of the IAB node assumes that a downlink (DL) operation can be performed in the resource. Alternatively, when the resource for transmitting the SSB for the access UE is a DL soft resource, the DU of the IAB node assumes that an operation as the DU can be performed in the resource.

(Method 4-2-c) When the DU of the IAB node cannot transmit the access SSB in the resource for transmitting the SSB for the access UE according to a semi-static DU configuration and a dynamic DU configuration assigned thereto, the DU of the IAB node may not transmit the access SSB. The dynamic DU configuration may refer to a configuration about a link direction and/or availability per time domain for the DU of the IAB node assigned through L1 signaling. A resource not available for transmission of the access SSB according to the semi-static DU configuration and the dynamic DU configuration may include the following resources.

NA resource

UL hard/soft resource

DL soft resource configured as INA

Flexible resource by L1 signaling (e.g., group-common DCI)

Next, SSB transmission for backhaul discovery/measurement is described.

IAB nodes may transmit an SSB for backhaul discovery (i.e., a backhaul SSB) to discover each other and to measure each other. A DU of an IAB node periodically or aperiodically transmits a backhaul SSB thereof to allow other IAB nodes to discover and/or measure the IAB node, and an MT of the IAB node periodically or aperiodically receives a backhaul SSB transmitted by neighboring IAB nodes to discover and/or measure the neighboring IAB nodes. Here, for example, when the IAB node is configured to perform an operation as an MT, rather than an operation as a DU, in a resource for transmitting a backhaul SSB, the IAB node may not transmit a backhaul SSB. In this case, the IAB node may not transmit an SSB in a resource via which neighboring IAB nodes expects that the SSB is transmitted.

A backhaul SSB transmission resource may follow the foregoing access SSB transmission method for an SSB for an access UE. That is, an access SSB and an access UE in the access SSB transmission method may be replaced respectively with a backhaul SSB and a neighboring IAB node in SSB transmission for backhaul discovery/measurement. Here, a transmission method applied to an access SSB and a transmission method applied to a backhaul SSB may be different from each other.

In the disclosure, it is assumed that IAB nodes transmit a backhaul SSB as a backhaul discovery signal to discover each other and to measure each other. However, the disclosure may also be applied when different types of signals other than the SSB are used as backhaul discovery signals.

In this specification, an access SSB may refer to an SSB transmitted by an IAB node to a UE, and a backhaul SSB may refer to an SSB transmitted by the IAB node to another IAB node. The access SSB and the backhaul SSB may have the same structure or may have different structures. Alternatively, the access SSB and the backhaul SSB may be distinguished from each other by allocated resources and included information.

Figure 20:
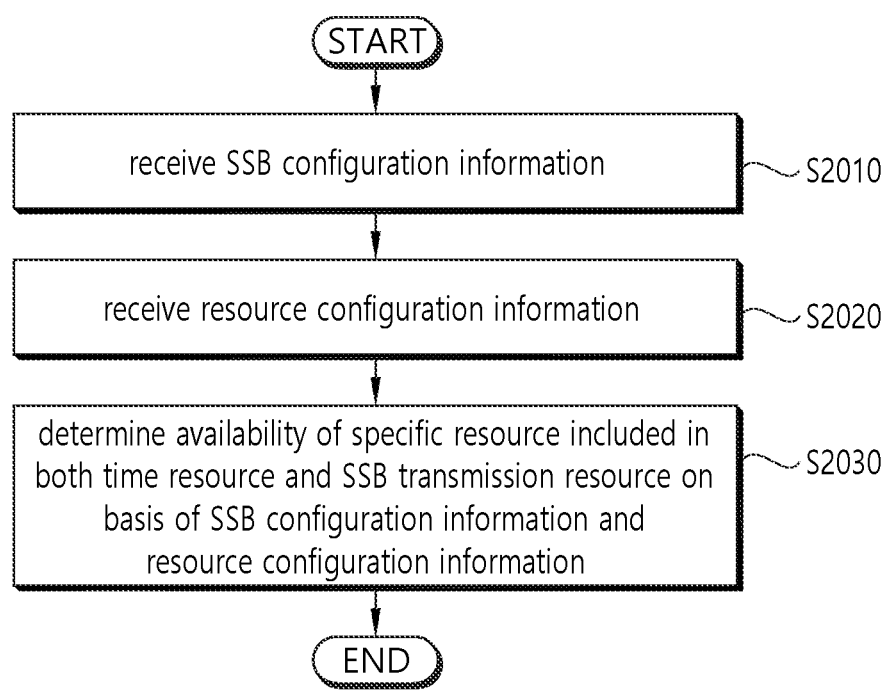
FIG. 20 is a flowchart illustrating an example of a method for determining the availability of a resource performed by an TAB node according to some embodiments of the disclosure.

FIG. 20 is a flowchart illustrating an example of a method for determining the availability of a resource performed by an IAB node according to some embodiments of the disclosure.

Referring to FIG. 20, the IAB node receives SSB configuration information (S2010). Here, the SSB configuration information may include information about an SSB transmitted and/or received by the IAB node. In one example, the SSB configuration information may indicate an SSB transmission resource for the IAB node to transmit the SSB.

The IAB node receives resource configuration information (S2020). Here, the resource configuration information may include a DU configuration. That is, the IAB node may obtain a link direction configuration and/or an availability configuration of a time resource related to communication with a child node thereof through the resource configuration information. For example, the IAB node may identify, on the basis of the resource configuration information, whether each time resource is a DL resource, a UL resource, an F resource, or an unavailable (NA) resource and whether a DL resource, a UL resource, and an F resource are hard resources or soft resources.

The IAB node determines the availability of a specific resource included in both the time resource and the SSB transmission resource on the basis of the SSB configuration information and the resource configuration information (S2030). Here, the SSB transmission resource may be a resource configured for the IAB node to transmit the SSB on the basis of the SSB configuration information.

Here, in an example of [Method 4-1], when the SSB transmission resource is not configured as a hard resource on the basis of the resource configuration information, the IAB node may assume that the SSB transmission resource is a hard resource. Specifically, even though the SSB transmission resource is configured as a soft resource on the basis of the resource configuration information, the IAB node may assume that the SSB transmission resource is configured as a hard resource according to (Method 4-1-b). That is, when the SSB transmission resource is not configured as a hard resource according to the resource configuration information, the IAB node may determine the availability of the SSB transmission resource as a hard resource, that is, as being always available, in step S2030.

Although not shown in the drawing, the IAB node may transmit the SSB in the SSB transmission resource according to (Method 4-1-a). Thus, an operation of the IAB node transmitting the SSB is guaranteed.

Although not shown in the drawing, the IAB node may receive the resource configuration information after receiving the SSB configuration information, may receive the SSB configuration information after receiving the resource configuration information, or may simultaneously receive the SSB configuration information and the resource configuration information.

Figure 21:
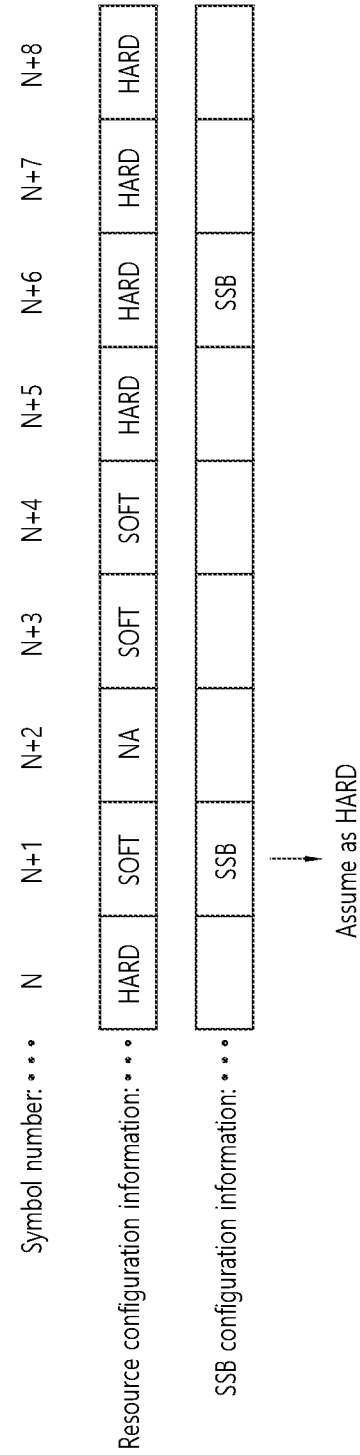
FIG. 21 schematically illustrates an example of applying a method for determining the availability of a resource performed by an TAB node according to some embodiments of the disclosure.

FIG. 21 schematically illustrates an example of applying a method for determining the availability of a resource performed by an IAB node according to some embodiments of the disclosure.

In FIG. 21, it is assumed that the IAB node has received resource configuration information and SSB configuration information. Referring to FIG. 21, the IAB node knows that the IAB node performs SSB transmission on symbol N+1 and symbol N+6 on the basis of the SSB configuration information.

Symbol N+1 and symbol N+6, which are indicated for SSB transmission of the IAB node on the basis of the SSB configuration information, are configured as a soft resource and a hard resource, respectively, on the basis of the resource configuration information.

In this case, according to (Method 4-1-b), for example, symbol N+1 is considered as being configured as a hard resource for the IAB node. That is, according to (Method 4-1-b), the IAB node assumes that symbol N+1 is a hard resource despite the resource configuration information. In this case, the IAB node may determine symbol N+1 as an always available resource without any explicit or implicit control of a parent node. Further, according to (Method 4-1-a), even though the parent node does not explicitly or implicitly transmit information indicating that symbol N+1 is available to the IAB node, the IAB node may perform SSB transmission on symbol N+1.

Although FIG. 21 illustrates an example of a resource in symbols, the method illustrated in FIG. 21 may also be applied to resources in various units, such as a slot.

NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 4. For convenience of description, FR1 of the frequency ranges used for an NR system may refer to a "sub 6 GHz range", and FR2 may refer to an "above 6 GHz range" and may be referred to as a millimeter wave (mmW).

TABLE 4

| Frequency range designation | Corresponding frequency range | Subcarrier spacing |
| --- | --- | --- |
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 5. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 5

| Frequency range designation | Corresponding frequency range | Subcarrier spacing |
| --- | --- | --- |
| FR1 | 410 MHz-7125 MHz | 15, 30, 60 kHz |
| FR2 | 24250 MHz-52600 MHz | 60, 120, 240 kHz |

Next, discovery/measurement of a neighbor IAB node is described.

An IAB node may receive a backhaul SSB transmitted by other IAB nodes via a resource configured for discovery/measurement of a different IAB node or a resource configured to mute backhaul SSB transmission thereof to discover/measure a neighboring IAB node. Here, when the IAB node is configured to transmit a backhaul SSB thereof in the resource configured for discovery/measurement for the different IAB node, the IAB node may mute backhaul SSB transmission thereof.

In the disclosure, a resource configured for an IAB node to discover/measure a different IAB node or a resource configured for an IAB node to mute backhaul SSB transmission thereof is referred to as a discovery resource. For example, when an IAB node is configured to perform an operation as a DU, rather than an operation as an MT, in a discovery resource, the IAB node may not perform an operation of discovering/measuring another IAB node.

Here, the discovery resource configured for the IAB node may conflict with 1) a DU operation resource or 2) an MT uplink (UL) transmission resource. In addition, the discovery resource configured for the IAB node may conflict with 3) a resource configured/scheduled for communication with a parent node since it may be difficult to simultaneously perform downlink (DL) reception with a parent node and an operation of discovering/measuring a neighboring IAB node in frequency range 2 (FR2) using analog beamforming. In view of such conflicts, the disclosure proposes the following operations for the IAB node.

1) Conflict Between Discovery Resource and DU Operation Resource

A resource configured as a discovery resource for the IAB node may also be configured for a DU operation at the same time. In this case, it is proposed that the IAB node operates as follows.

[Method 6-1-1] The IAB node may always perform an operation as an MT for discovering/measuring a neighboring IAB node, rather than a DU operation, in the resource configured as the discovery signal regardless of a DU configuration thereof. To this end, according to another method, the IAB node may assume that the DU configuration is unavailable (NA) in the resource configured as the discovery resource.

[Method 6-1-2] Even though the resource configured as the discovery resource is configured for a DU operation, the IAB node may perform an operation as an MT for discovering/measuring a neighboring IAB node, rather than a DU operation, according to a condition. Here, even though the resource configured as the discovery resource is configured as a discovery resource among all or some of the following resources, the IAB node may preferentially perform an operation as a DU in the resource and may perform an operation as an MT for discovering/measuring a neighboring IAB node, rather than the DU operation, in the remaining resources. That is, even though all or some of the following resources are configured as discovery resources for the IAB node, the IAB node may preferentially perform the DU operation in the resources.

Resource semi-statically configured via an F1-AP, system information, or RRC to transmit data or a signal to a child node or an access UE Resource semi-statically configured via an F1-AP, system information, or RRC to receive data or a signal from a child node or an access UE Resource dynamically configured via MAC signaling to transmit data or a signal to a child node or an access UE Resource dynamically configured via MAC signaling to receive data or a signal from a child node or an access UE Resource dynamically configured via L1-signaling to transmit data or a signal to a child node or an access UE Resource dynamically configured via L1-signaling to receive data or a signal from a child node or an access UE

[Method 6-1-3] The IAB node may construe, as a discovery resource thereof, a resource in which a DU operation is not performed according to a DU configuration among resources configured to transmit a backhaul SSB. Specifically, the resource in which the DU operation is not performed according to the DU configuration may include all or some of the following resources.

Resource configured as unavailable (NA) according to a semi-static DU configuration Soft resource configured as unavailable (INA) via dynamic L1-signaling and explicit L1-signaling Soft resource configured to transmit and receive data and/or a signal via a DL grant/UL grant

[Method 6-1-4] A discovery resource for the IAB node may exist only among resources configured as unavailable (NA) for a DU operation according to a DU configuration. Therefore, when a resource other than an unavailable resource is configured as a discovery resource for the IAB node, the IAB node performs an operation as a DU in the resource and excludes the resource from discovery resources.

2) Conflict Between Discovery Resource and MT Uplink (UL) Operation Resource

A resource configured as a discovery resource for the IAB node may also be configured for uplink (UL) transmission with a parent node at the same time. In this case, it is proposed that the IAB node operates as follows.

[Method 6-2-1] The IAB node may perform a downlink (DL) operation and an operation of discovering/measuring a neighboring IAB node in a resource configured as a discovery resource regardless of an MT configuration to the IAB node. That is, the IAB node may assume that the semi-static/dynamic MT configuration is overridden by a downlink (DL) in the resource configured as the discovery resource. Alternatively, the IAB node may disregard the semi-static/dynamic MT configuration and may assume that the resource is configured for a downlink (DL).

[Method 6-2-2] The IAB node may perform a downlink (DL) operation and an operation of discovering/measuring a neighboring IAB node in a resource configured as a discovery resource regardless of a semi-static MT configuration. However, the IAB node follows a configuration by dynamic L1-signaling and cannot perform an operation of discovering/measuring a neighboring IAB node in a resource configured as an (UL) resource or a flexible resource through dynamic L1-signaling (e.g., group-common DCI or a DL grant/UL grant). That is, a semi-static MT configuration is overridden by a downlink (DL) in a discovery resource region, and a dynamic MT link direction configuration may override the discovery resource region.

[Method 6-2-3] The IAB node may perform a downlink operation and an operation of discovering/measuring a neighboring IAB node in a region, available for a downlink operation according to an MT configuration thereof, of the resource configured as the discovery resource. The region available for the downlink operation may refer to all or some of the following resources.

Resource configured as a downlink resources according to a semi-static MT configuration Resource configured as a downlink resource according to group-common DCI Resource configured for a downlink operation according to a DL grant 3) Conflict Between Discovery Resource and Resource Configured/Scheduled for Communication with Parent Node For example, it may be difficult to simultaneously perform downlink reception with a parent node and an operation of discovering/measuring a neighboring IAB node in frequency range 2 (FR2) using analog beamforming. Therefore, when the IAB node is configured to receive a downlink channel or a signal from a parent node in a resource configured as a discovery resource, the IAB node may operate as follows.

[Method 6-3-1] The IAB node may perform an operation of discovering/measuring a neighboring IAB node in the resource configured as the discovery resource regardless of an MT configuration thereof. Here, the IAB node may not perform a transmission/reception operation with the parent node.

[Method 6-3-2] The IAB node may perform an operation of discovering/measuring a neighboring IAB node in the resource configured as the discovery resource regardless of a semi-static MT configuration thereof. Here, the IAB node may not perform a transmission/reception operation with the parent node. However, the IAB node may perform a transmission/reception operation with the parent node and may not perform an operation of discovering/measuring a neighboring IAB node according to a configuration through dynamic L1-signaling in a resource configured as a downlink (DL) resource, an uplink (UL) resource, or a flexible (F) resource through dynamic L1-signaling (e.g., group-common DCI or a DL grant/UL grant).

[Method 6-3-3] The IAB node may perform an operation of discovering/measuring a neighboring IAB node in the resource configured as the discovery resource regardless of an MT configuration thereof. Here, the IAB node may not perform a transmission/reception operation with the parent node. However, the IAB node may perform a transmission/reception operation with the parent node and may not perform an operation of discovering/measuring a neighboring IAB node in a resource dynamically configured for a downlink/uplink operation with the parent node through a DL grant/UL grant.

[Method 6-3-4] When the resource configured as the discovery resource is configured as a downlink resource according to a semi-static MT configuration set for the IAB node, the IAB node may perform an operation of discovering/measuring a neighboring IAB node in the resource. In addition, when the IAB node is configured to perform data reception with the parent node according to a DL grant and/or aperiodic TRS/CSI-RS reception in the downlink resource, the IAB node performs a reception operation with the parent node and cannot perform an operation of discovering/measuring a neighboring IAB node.

[Method 6-3-5] When the resource configured as the discovery resource is configured as a downlink resource according to a semi-static MT configuration set for the IAB node or according to group-common DCI dynamically transmitted, the IAB node may perform an operation of discovering/measuring a neighboring IAB node in the resource. In addition, when the IAB node is configured to perform data reception with the parent node according to a DL grant and/or aperiodic TRS/CSI-RS reception in the downlink resource, the IAB node performs a reception operation with the parent node and cannot perform an operation of discovering/measuring a neighboring IAB node.

Here, the IAB node may determine whether to apply a solution to 3) the conflict between the discovery resource and the resource configured/scheduled for communication with the parent node according to the frequency band in which the IAB node operates. For example, the IAB node may not consider the conflict between the discovery resource and the resource configured/scheduled for communication with the parent node in FR1 but may operate in FR2 considering the conflict between the discovery resource and the resource configured/scheduled for communication with the parent node. Alternatively, information about whether to apply a solution to 3) the conflict between the discovery resource and the resource configured/scheduled for communication with the parent node may be configured or transmitted. For example, this information may be configured or transmitted to the IAB node using a master information block (MIB) transmitted via a backhaul SSB, system information, RRC, or an F1-AP.

In the disclosure, it is assumed that IAB nodes transmit a backhaul SSB as a backhaul discovery signal in order to discover each other and to measure each other. However, the disclosure may also be applied when different types of signals other than the SSB are used as backhaul discovery signals.

For example, a backhaul SSB may be transmitted as follows. A time resource for transmitting the backhaul SSB may be the same for all IAB nodes. This backhaul SSB transmission resource may be configured for a downlink (DL) according to a DU configuration. In this case, an MT configuration of an IAB node in this resource is also configured for a downlink (DL). Here, in a specific region of the backhaul SSB transmission time, the IAB node may mute backhaul SSB transmission and may perform an operation of discovering/measuring a neighboring IAB node. In this case, the IAB node may assume/determine that the DU configuration is unavailable (NA) in the resource configured to mute the backhaul SSB transmission and may perform an operation as an MT.

Figure 22:
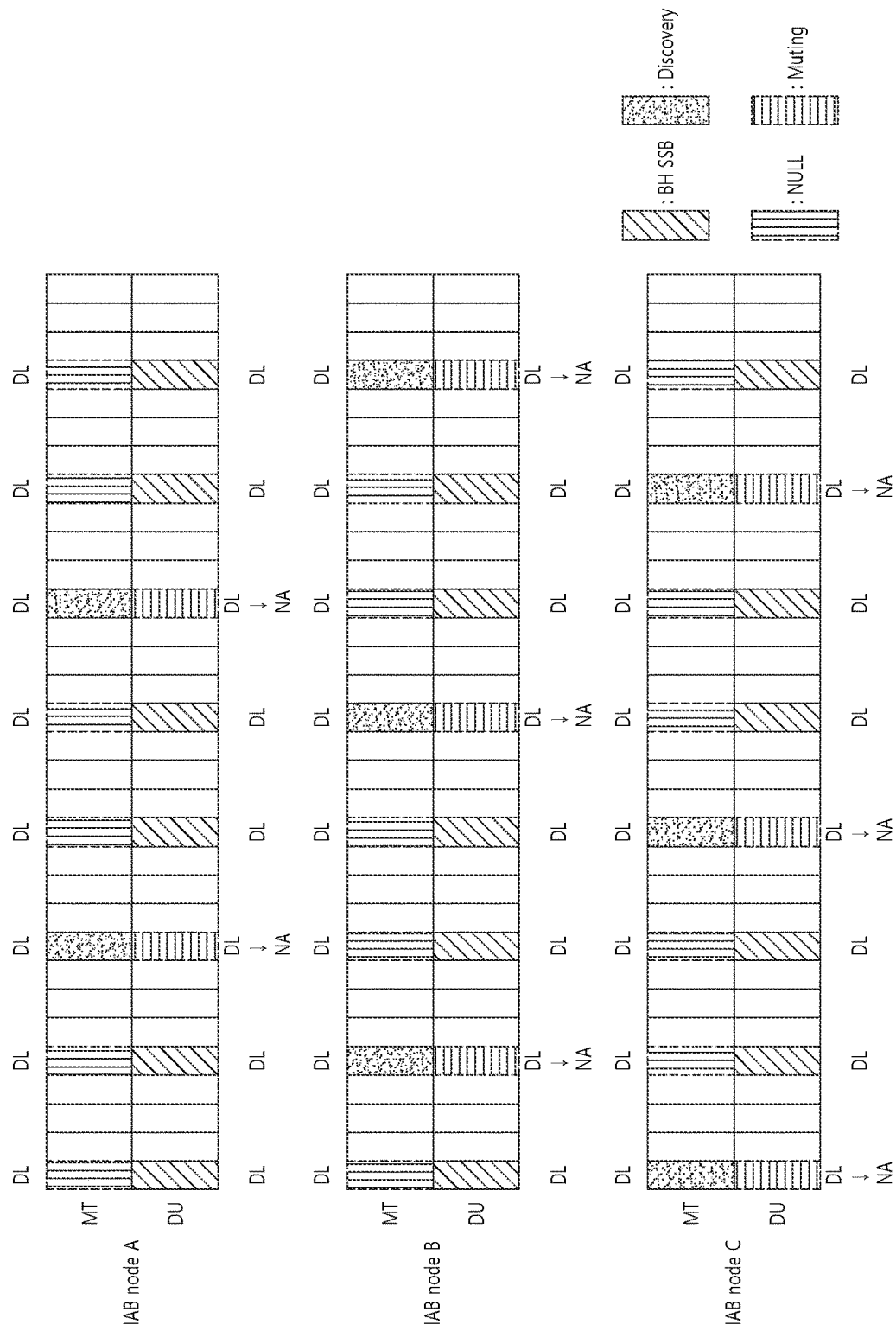
FIG. 22 illustrates a method for configuring a resource for an operation of discovering/measuring an IAB node according to some embodiments of the disclosure.

FIG. 22 illustrates a method for configuring a resource for an operation of discovering/measuring an IAB node according to some embodiments of the disclosure.

Referring to FIG. 22, when there are IAB nodes A, B, and C, a resource is configured such that a backhaul SSB (BH SSB) is basically transmitted to all IAB nodes at the same position. Accordingly, a time resource for transmitting the backhaul SSB is configured as a downlink resource according to a DU configuration. Here, the downlink resource may be limited to a hard resource or may be a hard resource or a soft resource. Since the time resource for transmitting the backhaul SSB is configured as the downlink resource according to the configuration, an MT configuration of the IAB nodes may be also configured for the downlink in the resource in order to receive the backhaul SSB. Here, referring to FIG. 22, a resource for IAB node-specifically muting backhaul SSB transmission and performing an operation of discovering and/or measuring a neighboring IAB node may be configured. In this case, the IAB node may assume that the DU configuration is changed to unavailable (NA) in the resource. Accordingly, an IAB node may operate as an MT, without performing an operation as a DU, in the resource, and may perform an operation of discovering and/or measuring a neighboring IAB node without any problem in the resource, which is configured for the downlink for the MT.

For the IAB node, an SSB transmission configuration (STC), which is a configuration about a time resources for transmitting a backhaul SSB, and an SSB measurement time configuration (SMTC), which is a configuration about a time resource for performing an operation of discovering and/or measuring a neighboring IAB node using a backhaul SSB transmitted from the neighboring IAB node may be configured.

Here, case 1 where some of resources configured to transmit an SSB according to the STC are configured to perform an operation of discovering and/or measuring a neighboring IAB node according to the SMTC and case 2 where some of resources configured to perform an operation of discovering and/or measuring a neighboring IAB node according to the SMTC are configured to transmit an SSB according to the STC may be considered.

Figure 23:
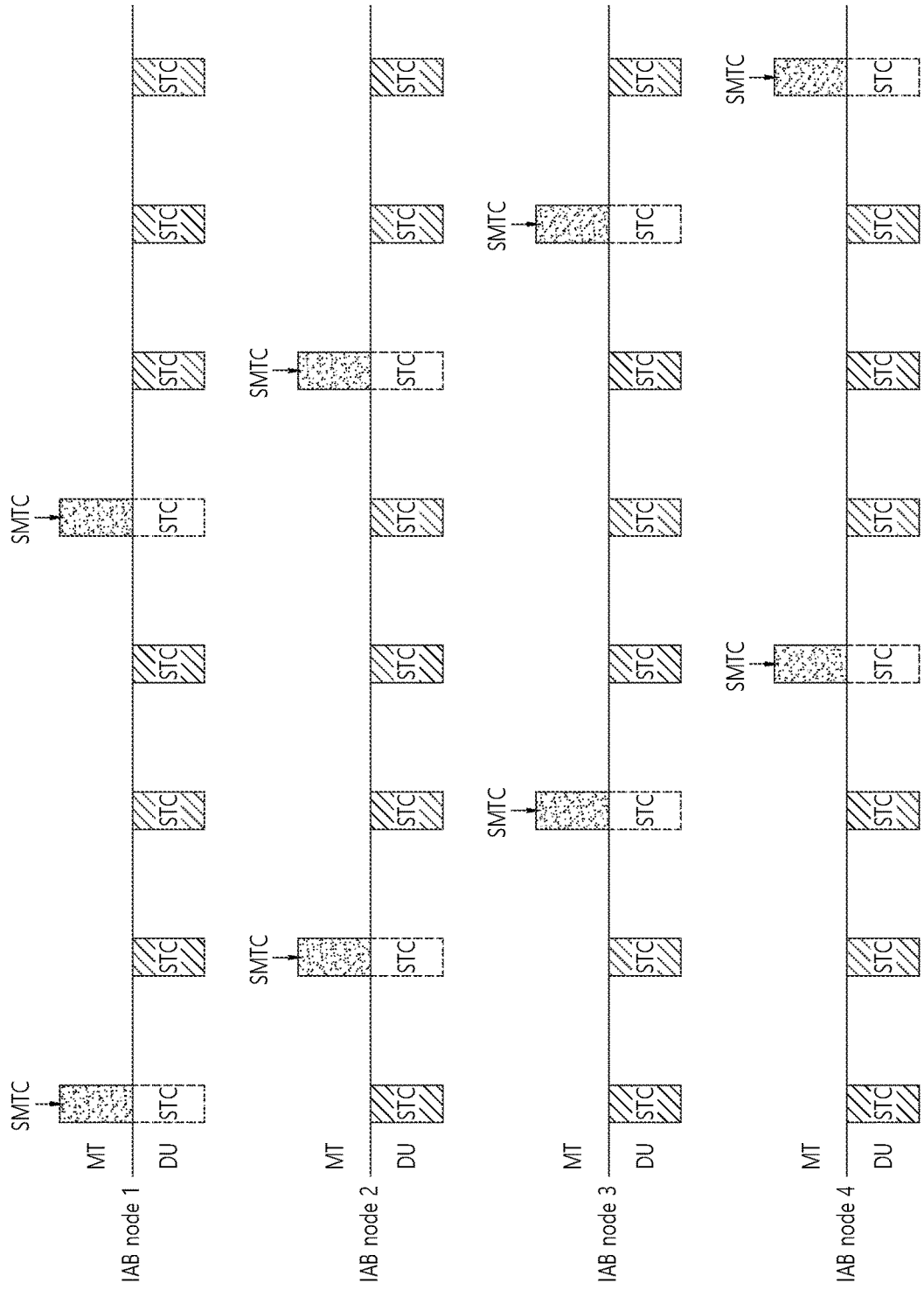
FIG. 23 schematically illustrates an example of case 1 where some of resources configured to transmit an SSB according to the STC are configured to perform an operation of discovering and/or measuring a neighboring IAB node according to the SMTC.

FIG. 23 schematically illustrates an example of case 1 where some of resources configured to transmit an SSB according to the STC are configured to perform an operation of discovering and/or measuring a neighboring IAB node according to the SMTC.

Referring to FIG. 23, time resources having the same period are commonly configured as STC resources for IAB nodes 1 to 4. Further, time resources having the same period are commonly configured as SMTC resources for IAB nodes 1 to 4. Here, the period of the SMTC resources may be a multiple of the period of the STC resources.

Here, IAB nodes 1 to 4 may have the same period but may use different time resources as SMTC resources, respectively. For example, an SMTC resource for IAB node 1 may be configured at a specific time that is the same as the time of STC resources for IAB nodes 2 to 4.

In case 1, an IAB node basically transmits an SSB according to the STC. When there is a conflict between the STC and the SMTC, the IAB node mutes SSB transmission and performs an operation of discovery/transmission to a neighboring IAB node.

Figure 24:
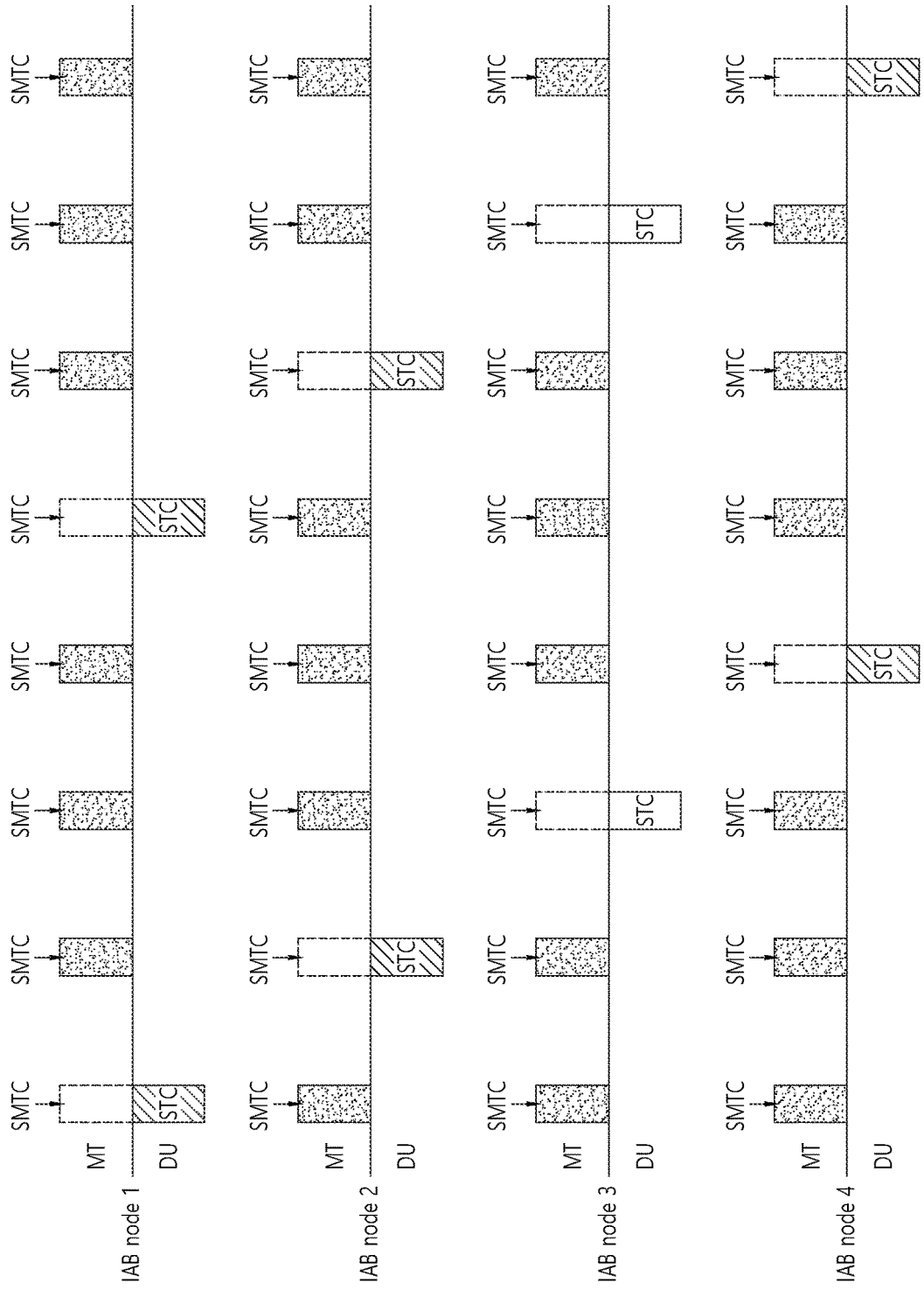
FIG. 24 schematically illustrates an example of case 2 where some of resources configured to perform an operation of discovering and/or measuring a neighboring IAB node according to the SMTC are configured to transmit an SSB according to the STC.

FIG. 24 schematically illustrates an example of case 2 where some of resources configured to perform an operation of discovering and/or measuring a neighboring IAB node according to the SMTC are configured to transmit an SSB according to the STC.

Referring to FIG. 24, time resources having the same period are commonly configured as SMTC resources for IAB nodes 1 to 4. Further, time resources having the same period are commonly configured as STC resources for IAB nodes 1 to 4. Here, the period of the STC resources may be a multiple of the period of the SMTC resources.

Here, IAB nodes 1 to 4 may have the same period but may use different time resources as STC resources, respectively. For example, an STC resource for IAB node 1 may be configured at a specific time that is the same as the time of SMTC resources for IAB nodes 2 to 4.

In case 2, the IAB node performs an operation of measuring a neighboring IAB node according to the SMTC every SMTC period. When there is a conflict between the STC and the SMTC, the IAB node performs SSB transmission instead of performing an operation of measuring a neighboring IAB node.

A time region for indicating the link direction of a child link and the availability of a DU operation using a DU configuration is restricted, and a configuration for this restricted region is repeatedly used at specific intervals. That is, the time region that can be configured with the DU configuration is 40 milliseconds (msec), the configuration is repeatedly applied every 40 msec. A period in which the DU configuration is applied may be shorter than the period of the SMTC and/or STC. Therefore, it is possible to configure an STC resource and an SMTC resource as a hard resource and an unavailable (NA) resource, respectively. For example, the DU configuration may indicate the link direction and availability for a 40-msec symbol period, but the SMTC and the STC may have a period of 320 msec and a period of 80 msec, respectively. In this case, symbols available for an SSB discovery operation may be configured as DU hard resources. These symbols may also be used for measurement of a neighboring IAB node in a certain period. However, an MT of an IAB node cannot perform a measurement operation because these resources are configured as DU hard resources.

In order to solve this problem, a method may be considered in which a DU hard resource is assumed as an STC resource and a DU unavailable (NA) resource is assumed as an SMTC resource. When there is a conflict between an STC and an SMTC, a DU hard resource may be assumed if an STC period is longer than an SMTC period, and a DU unavailable resource may be assumed if the SMTC period is longer than the STC period.

Next, a measurement gap for an IAB node is described.

When the IAB node performs inter-frequency measurement, a measurement gap may be set, and the IAB node may perform the inter-frequency measurement using the region of the measurement gap. As in the foregoing SSB transmission for backhaul discovery/measurement, a resource for the measurement gap may also have 1) a conflict with a DU operation resource, 2) a conflict with an MT uplink (UL) transmission resource, and 3) a conflict with a resource for communication with a parent node. Therefore, the resource configured as the measurement gap may follow the IAB node operation method in the discovery resource region proposed in the foregoing SSB transmission for backhaul discovery/measurement. That is, a discovery resource and discovery/measurement of a neighboring node in the SSB transmission for backhaul discovery/measurement may be replaced with the measurement gap and the inter-frequency measurement, respectively. In this case, an IAB node operation method applied to the discovery resource and the IAB node operation method applied to the measurement gap may be different from each other.

Claims in this specification may be combined in various ways. For instance, technical features of method claims of the specification may be combined to be implemented or performed in an apparatus, and technical features of apparatus claims may be combined to be implemented or performed in a method. Further, technical features of method claim(s) and technical features of apparatus claim(s) may be combined to be implemented or performed in an apparatus, and technical features of method claim(s) and technical features of apparatus claim(s) can be combined to be implemented or performed in a method.

The methods proposed herein may be performed by not only an IAB node but also at least one computer-readable medium including an instruction executed by at least one processor and an apparatus configured to control an IAB node, the apparatus including at least one processor and at least one memory that is operatively connected to the at least one processor and stores instructions, and the at least one processor executing the instructions to perform the methods proposed herein.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 25:
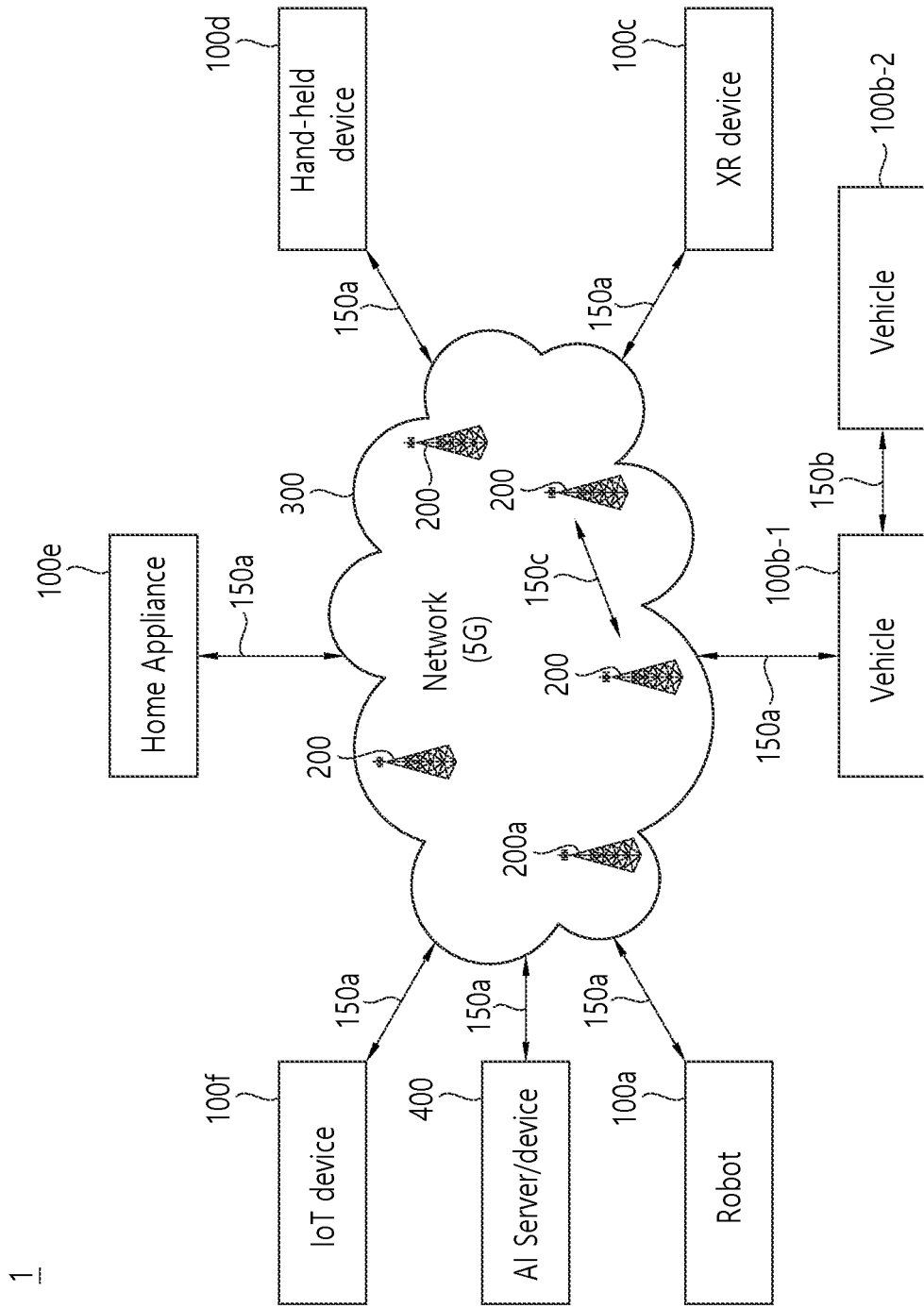
FIG. 25 illustrates a communication system 1 applied to the disclosure.

FIG. 25 illustrates a communication system 1 applied to the disclosure.

Referring to FIG. 25, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Hereinafter, an example of a wireless device to which the disclosure is applied is described.

Figure 26:
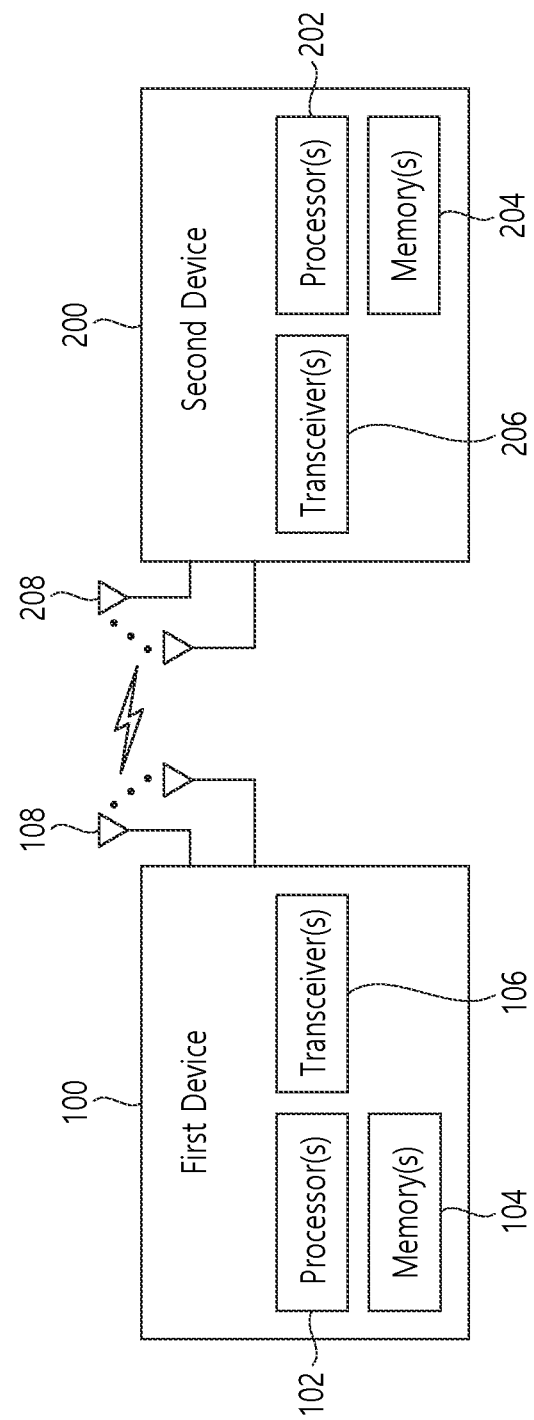
FIG. 26 illustrates a wireless device that is applicable to the disclosure.

FIG. 26 illustrates a wireless device that is applicable to the disclosure.

Referring to FIG. 26, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 25 and/or may respectively correspond to a wireless device 100x and a wireless device 100x of FIG. 25.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Hereinafter, an example of a signal processing circuit to which the disclosure is applied is described.

Figure 27:
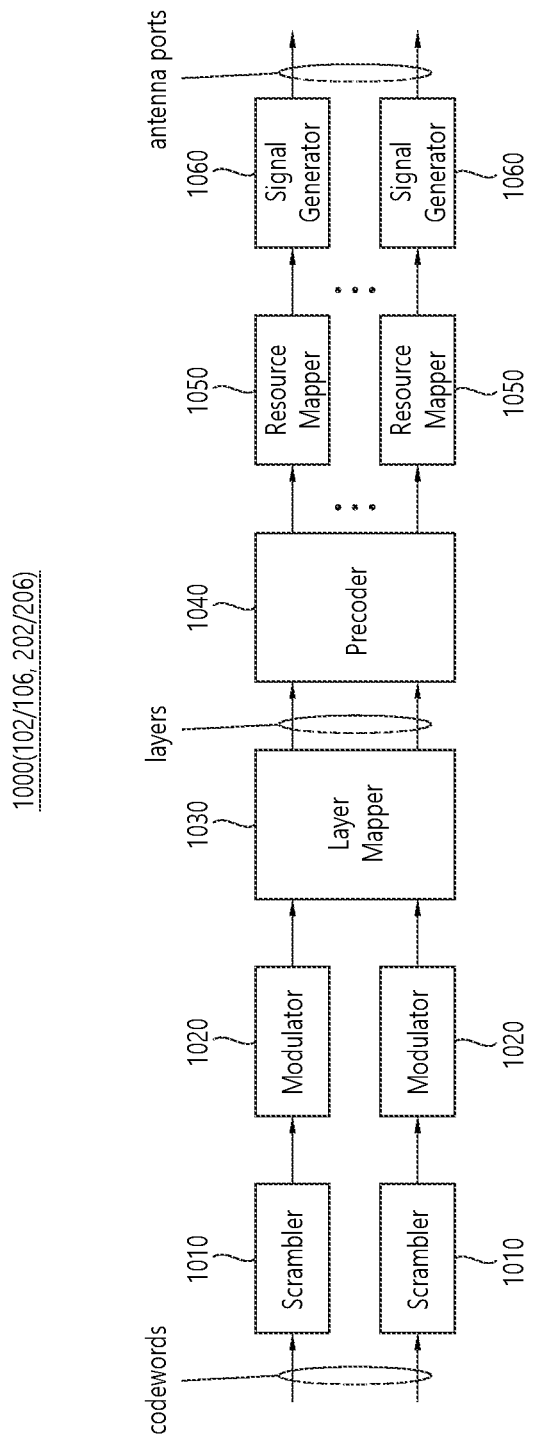
FIG. 27 illustrates a signal processing circuit for a transmission signal.

FIG. 27 illustrates a signal processing circuit for a transmission signal.

Referring to FIG. 27, the signal processing circuit 1000 may include a scrambler 1010, a modulator 1020, a layer mapper 1030, a precoder 1040, a resource mapper 1050, and a signal generator 1060. Operations/functions illustrated with reference to FIG. 27 may be performed, but not limited to, in the processor 102 and 202 and/or the transceiver 106 and 206 of FIG. 26. Hardware elements illustrated in FIG. 27 may be configured in the processor 102 and 202 and/or the transceiver 106 and 206 of FIG. 26. For example, blocks 1010 to 1060 may be configured in the processor 102 and 202 of FIG. 26. Alternatively, blocks 1010 to 1050 may be configured in the processor 102 and 202 of FIG. 26, and a block 1060 may be configured in the transceiver 106 and 206 of FIG. 26.

A codeword may be converted into a radio signal via the signal processing circuit 1000 of FIG. 27. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 27. For example, a wireless device (e.g., 100 and 200 of FIG. 26) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Hereinafter, an example of utilizing a wireless device to which the disclosure is applied is described.

Figure 28:
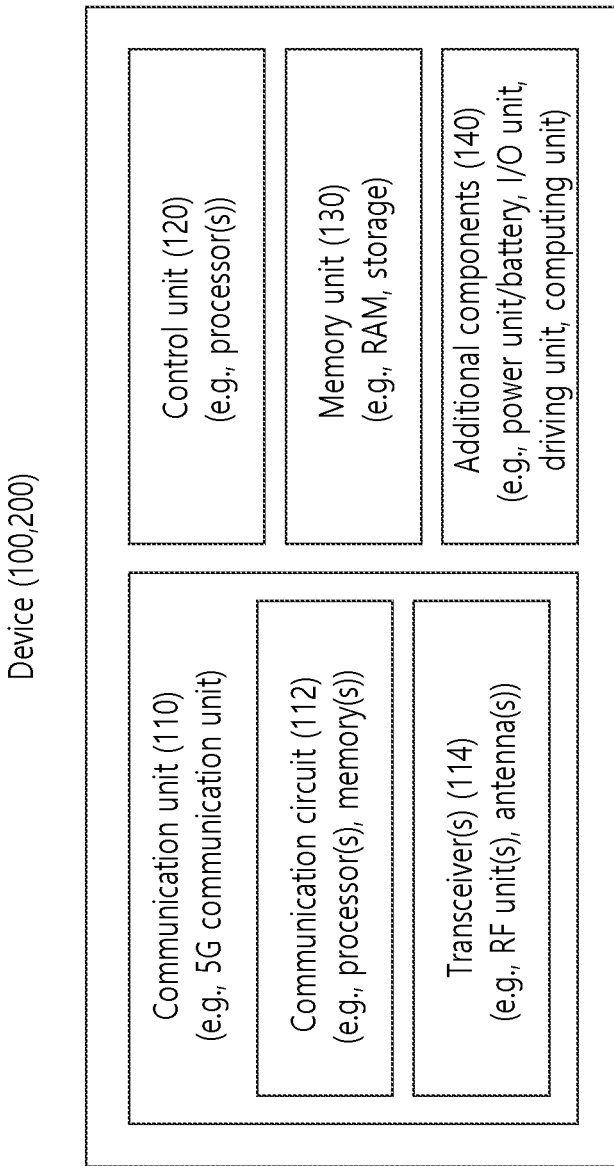
FIG. 28 illustrates another example of a wireless device applied to the disclosure.

FIG. 28 illustrates another example of a wireless device applied to the disclosure. The wireless device may be configured in various forms depending on usage/service.

Referring to FIG. 28, the wireless devices 100 and 200 may correspond to the wireless device 100 and 200 of FIG. 26 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 26. For example, the transceiver(s) 114 may include the at least one transceiver 106 and 206 and/or the at least one antenna 108 and 208 of FIG. 26. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100*a* in FIG. 25), a vehicle (100 *b*-1 or 100 *b*-2 in FIG. 25), an XR device (100 *c* in FIG. 25), a hand-held device (100 *d* in FIG. 25), a home appliance (100*e* in FIG. 25), an IoT device (100*f* in FIG. 25), a terminal for digital broadcasting, a hologram device, a public safety device, an MTC device, a medical device, a fintech device (or financial device), a security device, a climate/environmental device, an AI server/device (400 in FIG. 25), a base station (200 in FIG. 25), a network node, or the like. The wireless device may be mobile or may be used in a fixed place depending on usage/service.

In FIG. 28, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 28 is described in detail with reference to the accompanying drawing.

Hereinafter, an example of a hand-held device to which the disclosure is applied is described.

Figure 29:
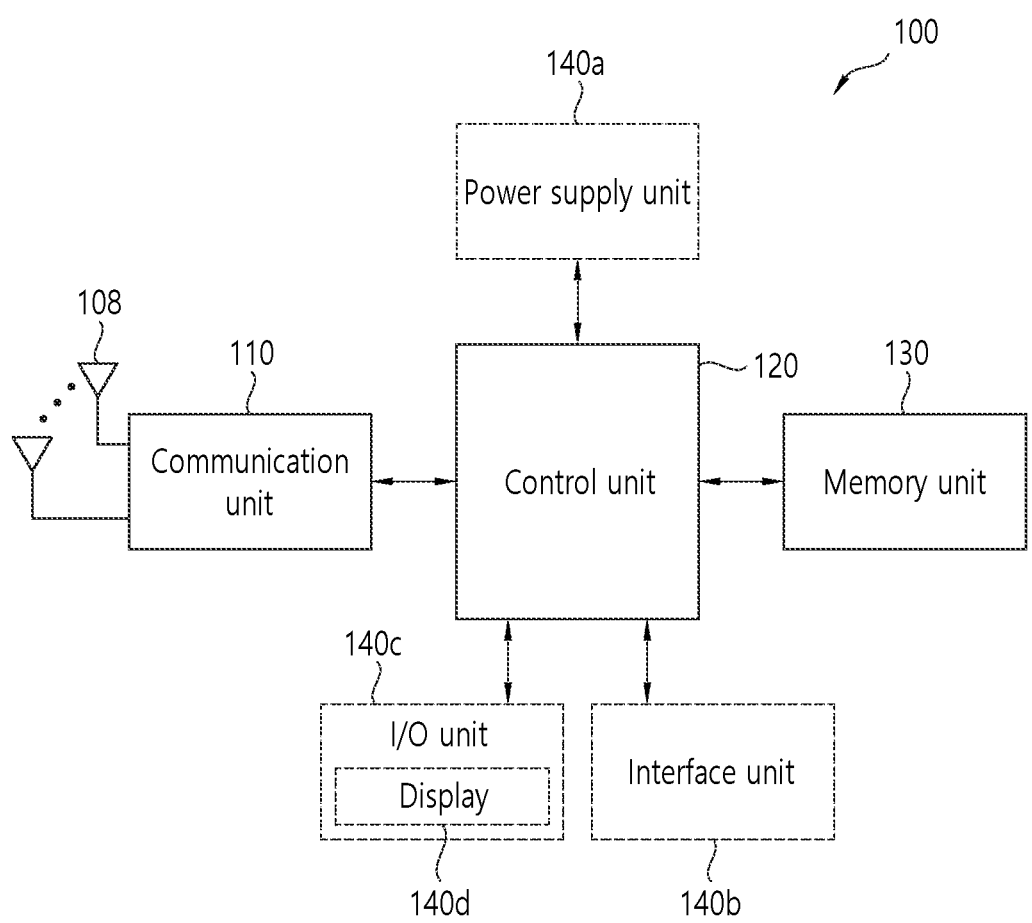
FIG. 29 illustrates a hand-held device applied to the disclosure.

FIG. 29 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 29, the hand-held device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. Blocks 110 to 130/140*a* to 140*c* correspond to the blocks 110 to 130/140 in FIG. 28, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Hereinafter, an example of a vehicle or an autonomous driving vehicle to which the disclosure is applied is described.

Figure 30:
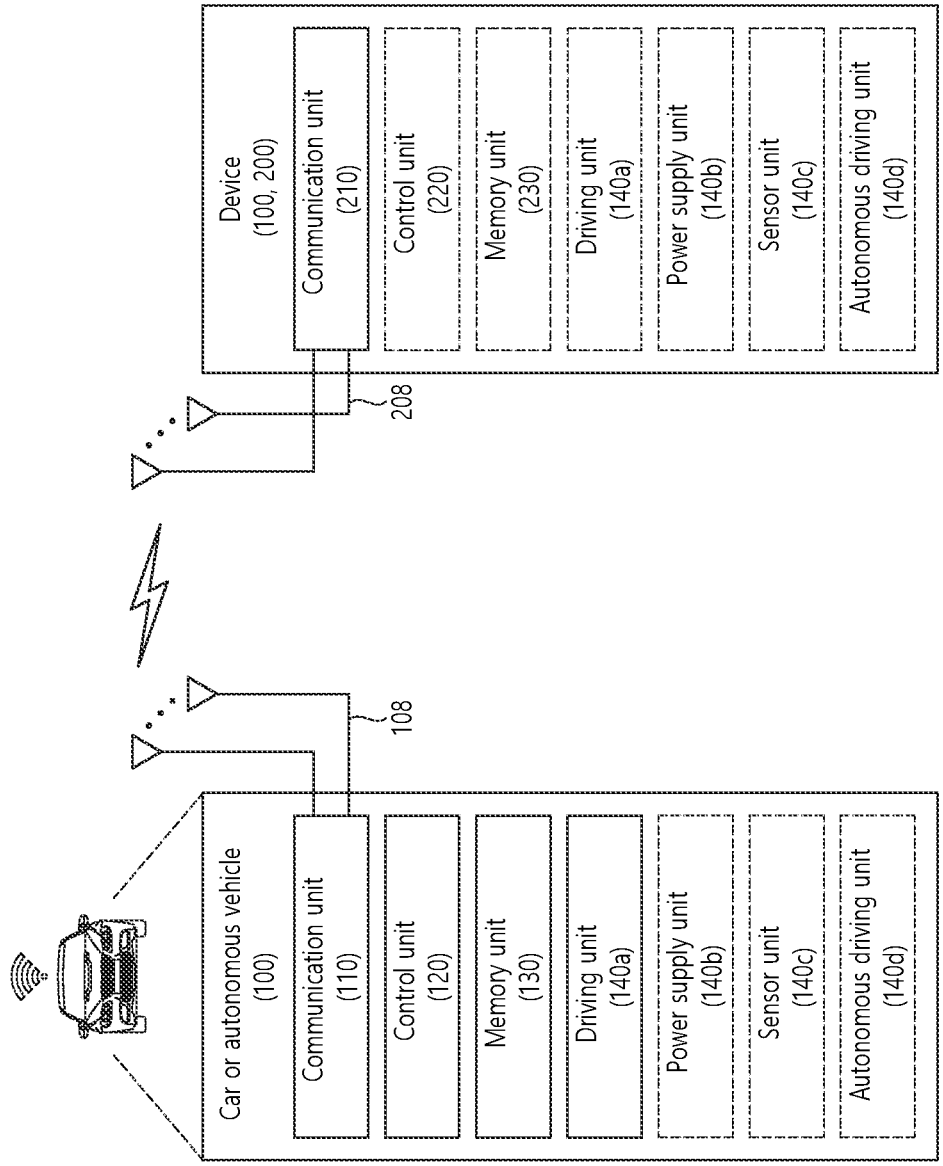
FIG. 30 illustrates a vehicle or an autonomous driving vehicle applied to the disclosure.

FIG. 30 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 30, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 28, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Hereinafter, an example of an AI device to which the disclosure is applied is described.

Figure 31:
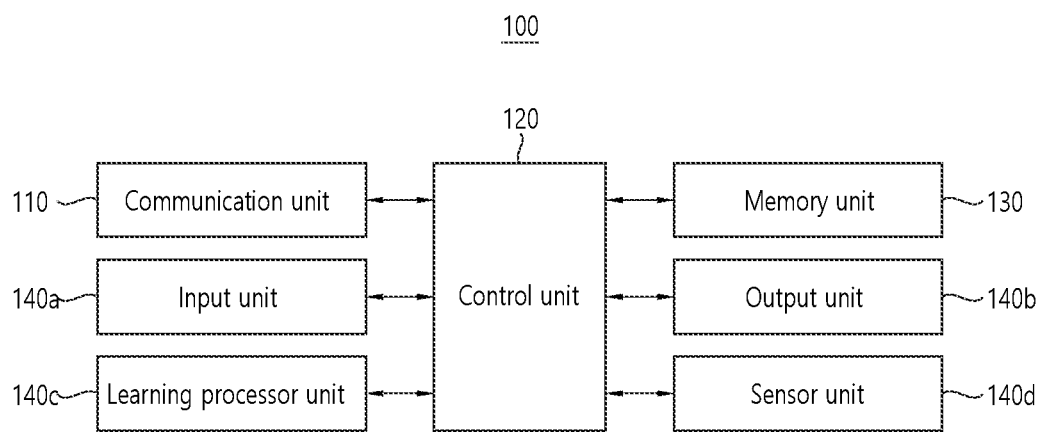
FIG. 31 illustrates an AI device applied to the disclosure.

FIG. 31 illustrates an AI device applied to the disclosure. The AI device may be configured as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 31, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 28, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 25) or an AI server (e.g., 400 in FIG. 25) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 25). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 25). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method for an operation of a node in a wireless communication system, the method comprising:
   receiving resource configuration, wherein a symbol in a slot can be configured to be of hard, soft, or unavailable by the resource configuration; and
   determining that the symbol in the slot is equivalent to being configured as hard, based on that the node would transmit a synchronization signal/physical broadcast channel (SS/PBCH) block in the symbol in the slot.

2. The method of claim 1, wherein when the symbol in the slot is configured as the hard, the node can i) transmit, ii) receive, or iii) either transmit or receive in the symbol in the slot.

3. The method of claim 1, wherein when the symbol in the slot is configured as the unavailable, the node neither transmits nor receives in the symbol in the slot.

4. The method of claim 1, wherein the symbol in the slot is configured as downlink, uplink, or flexible based on the resource configuration.

5. A node comprising:
   a transceiver; and
   at least one processor, and
   at least one computer memory operably connectable to the at least one processor and storing instructions that, when executed by the at least one processor, perform operations comprising:
   receiving resource configuration, wherein a symbol in a slot can be configured to be of hard, soft, or unavailable by the resource configuration; and
   determining that the symbol in the slot is equivalent to being configured as hard, based on that the node would transmit a synchronization signal/physical broadcast channel (SS/PBCH) block in the symbol in the slot.

6. The node of claim 5, wherein when the symbol in the slot is configured as the hard, the node can i) transmit, ii) receive, or iii) either transmit or receive in the symbol in the slot.

7. The node of claim 5, wherein when the symbol in the slot is configured as the unavailable, the node neither transmits nor receives in the symbol in the slot.

8. An apparatus configured to control a node, the apparatus comprising:
   at least one processor, and
   at least one computer memory operably connectable to the at least one processor and storing instructions that, when executed by the at least one processor, perform operations comprising:
   receiving resource configuration, wherein a symbol in a slot can be configured to be of hard, soft, or unavailable by the resource configuration; and
   determining that the symbol in the slot is equivalent to being configured as hard, based on that the node would transmit a synchronization signal/physical broadcast channel (SS/PBCH) block in the symbol in the slot.

* * * * *